United States Patent [19]
Peek et al.

[11] Patent Number: 5,745,791
[45] Date of Patent: Apr. 28, 1998

[54] SYSTEM FOR INTERFACING FIRST AND SECOND COMPONENTS HAVING DIFFERENT DATA PATH WIDTH BY GENERATING FIRST AND SECOND COMPONENT ADDRESS TO READ DATA INTO BUFFER

[75] Inventors: Greg A. Peek; Craig D. Cedros, both of Beaverton; Dick Reohr, Jr., Aloha, all of Oreg.

[73] Assignee: Intel Corporation, Santa Clara, Calif.

[21] Appl. No.: 503,329

[22] Filed: Jul. 17, 1995

Related U.S. Application Data

[63] Continuation of Ser. No. 945,668, Sep. 16, 1992, abandoned.
[51] Int. Cl.⁶ ................................................. G06F 15/40
[52] U.S. Cl. ........................................ 395/872; 395/309
[58] Field of Search .................................. 395/882, 883, 395/884, 885, 886, 250, 307, 309, 310, 311, 800, 872, 873, 876; 365/189.01, 189.02, 189.04, 189.05, 230.08

[56] References Cited

U.S. PATENT DOCUMENTS

| | | | |
|---|---|---|---|
| 4,612,541 | 9/1986 | Ohnishi | 370/452 |
| 4,751,671 | 6/1988 | Babetski et al. | 395/876 |
| 4,792,926 | 12/1988 | Roberts | 365/189.02 |
| 4,866,609 | 9/1989 | Calta et al. | 395/874 |
| 5,027,326 | 6/1991 | Jones | 365/221 |
| 5,034,879 | 7/1991 | Woodward et al. | 395/597 |
| 5,040,149 | 8/1991 | Ebihara et al. | 365/189.05 |
| 5,220,651 | 6/1993 | Larson | 395/828 |
| 5,224,213 | 6/1993 | Dieffenderfer et al. | 395/873 |
| 5,255,374 | 10/1993 | Alderegnia et al. | 395/293 |
| 5,280,589 | 1/1994 | Nakamura | 395/309 |
| 5,287,531 | 2/1994 | Rogers, Jr. et al. | 395/289 |
| 5,303,353 | 4/1994 | Matsuura et al. | 395/307 |
| 5,345,559 | 9/1994 | Okazaki et al. | 395/873 |
| 5,410,654 | 4/1995 | Foster et al. | 395/474 |
| 5,446,845 | 8/1995 | Arroyo et al. | 395/307 |
| 5,469,558 | 11/1995 | Lieberman et al. | 395/285 |

*Primary Examiner*—Moustafa M. Meky
*Attorney, Agent, or Firm*—Blakely, Sokoloff, Taylor & Zafman

[57] ABSTRACT

An apparatus for interfacing a memory with a bus in a computer system is described. The memory has a data path width which is different than the data path width of the bus. The apparatus comprises a first and a second buffer, a first and a second address generation circuit, and a control circuit. The first buffer is for storing a first portion and a second portion of a first data read from the memory during a read operation which are to be sent to the bus in parallel. The first address generation circuit is for receiving a first address from the bus during the read operation and generating a first memory address to address the memory for the first portion of the first data and a second memory address to address the memory for the second portion of the first data. The second buffer circuit is for storing a second data received from the bus during a write operation. The second address generation circuit is for receiving a second address from the bus for writing the second data into the memory during the write operation, and for generating a third memory address to write a third portion of the second data to the memory and a fourth memory address to write a fourth portion of the second data to the memory. During the read operation, the control circuit causes (1) the first address generation circuit to generate the first memory address and the first buffer to receive the first portion of the first data, and then (2) the first address generation circuit to generate the second memory address and the first buffer to receive the second portion of the first data. During the write operation, the control circuit causes (3) the second address generation circuit to generate the third memory address and the second buffer to send the third portion of the second data, and then (4) the second address generation circuit to generate the fourth memory address and the second buffer to send the fourth portion of the second data.

45 Claims, 14 Drawing Sheets

SYSTEM FOR INTERFACING FIRST AND SECOND COMPONENTS HAVING DIFFERENT DATA PATH WIDTH BY GENERATING FIRST AND SECOND COMPONENT ADDRESS TO READ DATA INTO BUFFER

This is a continuation of application Ser. No. 07/945,668, filed Sep. 16, 1992, now abandoned.

FIELD OF THE INVENTION

The present invention pertains to the field of computer systems. More particularly, this invention relates to an apparatus and a method for interfacing components with different data widths in a computer system.

BACKGROUND OF THE INVENTION

A prior computer system typically includes a central processing unit ("CPU"). The CPU typically is connected to a bus in order to communicate with random access memory ("RAM"), read-only memory ("ROM"), and other peripheral devices. The CPU typically adopts a data path width. The data path width that a prior CPU adopts is typically of eight, sixteen, or thirty-two bits. The bus that connects the CPU to the other devices of the system typically also adopts the same data path width as that of the CPU. Typically, the data path width that the CPU adopts is the data path width of the computer system. The peripheral devices typically include a display, a printer, a keyboard, a local area network ("LAN"), a MODEM, a disk drive, a serial communication port, and a parallel communication port. Each of these peripheral devices typically includes an adapter logic or an interface circuit connected to the bus in order to communicate with the CPU. The interface circuit for some of the peripheral devices typically includes an internal RAM for buffering data to be transferred to and from the particular peripheral device. Each of the peripheral devices may or may not adopt the same data path width of the computer system it connects to.

One prior peripheral device that requires a RAM for buffering data to be transferred to and from the computer system is the LAN. Typically, the LAN transmits data in data packets. Data is transmitted as serial bit stream in packets at a one packet at a time basis along the shared transmission bus of the LAN. When the data packets are received in the computer system, the interface circuit of the LAN needs to buffer the serial data packets and convert them into parallel data that have the same data path width as that of the CPU. In addition, when other devices in the computer system transmit data to the LAN, the interface circuit of the LAN also needs to buffer the data and transmit the data in serial bit stream in packets along the transmission bus of the LAN. Therefore, the RAM is typically required in the interface circuit of the LAN as a data buffer. The RAM may be replaced with other random access memories.

One prior approach to incorporating the RAM in the prior interface circuit is to employ a static RAM ("SRAM") that has the same data path width as that of the CPU and the bus of the computer system. For example, if the CPU of the computer system, as well as the bus of the computer system, have the data path width of 16 bits, the SRAM that is used in the prior interface circuit of the LAN will also have the data path width of 16 bits. In this case, no logical circuitry is required to interface the SRAM with the bus and direct data access of the CPU to the SRAM can be achieved.

Another prior approach to incorporating RAM in the interface circuit is to use a dynamic RAM ("DRAM") that has the data path width matching that of the computer systems. DRAMs with the data path width of 8 bits, 16 bits, or 32 bits are typically available.

Disadvantages are, however, associated with such approaches. One disadvantage associated is that DRAMs and SRAMs with data path widths of 8 bits, 16 bits, and 32 bits are typically far more expansive than DRAMs with a data path width of 4 bits. Another disadvantage associated with the approach to using SRAMs is that the SRAMs with more data pins are typically large in size and occupy more space in the computer system than the DRAMs.

A further disadvantage of the above mentioned approach to using the DRAMs is that a relatively large storage capacity is unused and therefore is wasted when the interface circuit adopts the DRAM that has the same data path width as that of the CPU. Typically, DRAMs with relatively large data path width have relatively large storage capacity. However, as stated above, the interface circuit of the LAN merely uses the DRAM as a buffering storage, which does not require relatively large storage capacity. This typically results in the waste of much of the storage capacity of the DRAM used.

Another prior approach to incorporating the RAM in the interface circuit is to use a number of DRAMs, each of which has a data path width of 4 bits. The number of the 4-bit DRAMs that are used depends on the data path width of the CPU of the computer system. For example, if the data path width of the CPU is 16 bits, the number of the 4-bit DRAMs used in the interface circuit will be four. Each of the four 4-bit DRAMs stores 4 bits of a data to be transferred to and from the CPU of the computer system.

This prior approach still bears some of the disadvantages that the previous prior approach has. One disadvantage associated is still the waste of the storage capacity. When four 4-bit DRAMs with the same storage capacity are used, for example, in the interface circuit to match with the data path width of the CPU, the total storage capacity is typically also very large, which typically results in some of the storage capacity being unused and therefore wasted. Another disadvantage is that by using more than one DRAM device in the interface circuit, more space is needed to accommodate the DRAMs in the interface circuit.

SUMMARY AND OBJECTS OF THE INVENTION

One of the objects of the present invention is to provide an apparatus and method for interfacing a first component in a computer system with a second component having a different data path width than that of the first component.

Another object of the present invention is to provide an apparatus and a method for interfacing a memory to a computer system, wherein the memory has a data path width different from that of the computer system.

A further object of the present invention is to provide an apparatus and a method for interfacing a memory to a computer system while maintaining a good throughput to the memory with a minimum cycle time.

A still further object of the present invention is to provide an apparatus and a method for interfacing a memory to a computer system having a different data path width than that of the memory while still maintaining a good throughput to the memory with a minimum cycle time.

An apparatus for interfacing a memory with a bus in a computer system is described. The memory has a data path width different than the data path width of the bus. The apparatus comprises a first buffer and a second buffer, a first address generation circuit and a second address generation circuit, and a control circuit. The first buffer is coupled to the memory and the bus for storing a first portion of a first data and a second portion of the first data read from the memory during a read operation of the memory in a first-in-first-out order, and for sending the first and second portions of the first data to the bus in parallel. The first and second portions of the first data are individually read from the memory during the read operation. The first address generation circuit is coupled to the bus and the memory for receiving a first address from the bus during the read operation to access the memory for the first data and for generating a first memory address based on the first address to address the memory for the first portion of the first data and a second memory address based on the first address to address the memory for the second portion of the first data. The second buffer circuit is coupled to the memory and the bus for storing a second data received from the bus during a write operation of the memory. The second data includes a third portion and a fourth portion. The third and fourth portions of the second data are loaded from the bus in parallel into the second buffer during the write operation. The third and fourth portions of the second data are to be individually written into the memory during the write operation. The second buffer sends the third and fourth portions of the second data to the memory individually during the write operation. The second address generation circuit is coupled to the memory and the bus for receiving a second address from the bus for writing the second data into the memory during the write operation, and for generating a third memory address based on the second address to write the third portion of the second data to the memory and a fourth memory address based on the second address to write the fourth portion of the second data to the memory. The control circuit is coupled to the first and second buffers and the first and second address generation circuits for controlling the first buffer and the first address generation circuit to read the first data from the memory during the read operation and the second buffer and the second address generation circuit to write the second data into the memory during the write operation. The control circuit receives a read command to start the read operation and receives a write command to start the write operation. During the read operation, the control circuit causes (1) the first address generation circuit to generate the first memory address from the first address to the memory and the first buffer to receive the first portion of the first data from the memory, and then (2) the first address generation circuit to generate the second memory address from the first address to the memory and the first buffer to receive the second portion of the first data from the memory. During the write operation, the control circuit causes (3) the second address generation circuit to generate the third memory address from the second address to the memory and the second buffer to send the third portion of the second data to the memory, and then (4) the second address generation circuit to generate the fourth memory address from the second address to the memory and the second buffer to send the fourth portion of the second data to the memory.

A method for interfacing a memory with a bus in a computer system is also described. The memory has a data path width different than the data path width of the bus. The method comprises the steps of:

(A) providing first buffer means that is coupled to the bus and the memory for storing a first portion and a second portion of a first data read from the memory during a read operation in a first-in-first-out order such that the first and second portions of the first data can be sent to the bus in parallel, wherein the first and second portions of the first data are individually read from the memory during the read operation;

(B) providing first address generation means that is coupled to the bus and the memory for receiving a first address from the bus during the read operation to access the memory for the first data and for generating a first memory address based on the first address to address the memory for the first portion of the first data and a second memory address based on the first address to address the memory for the second portion of the first data;

(C) providing second buffer means that is coupled to the memory and the bus for storing a second data received from the bus during a write operation, wherein the second data includes a third portion and a fourth portion, wherein the third and fourth portions of the second data are loaded from the bus in parallel into the second buffer means during the write operation, wherein the third and fourth portions of the second data are to be individually written into the memory during the write operation, and wherein the second buffer means sends the third and fourth portions of the second data to the memory individually during the write operation;

(D) providing second address generation means that is coupled to the memory and the bus for receiving a second address from the bus for writing the second data into the memory during the write operation, and for generating a third memory address based on the second address to write the third portion of the second data to the memory and a fourth memory address based on the second address to write the fourth portion of the second data to the memory; and (E) providing control means that is coupled to the first and second buffer means and the first and second address generation means for controlling the first buffer means and the first address generation means to read the first data during the read operation and the second buffer means and the second address generation means to write the second data during the write operation, wherein the control means receives a read command to start the read operation and a write command to start the write operation, wherein during the read operation, the control means causes (1) the first address generation means to generate the first memory address from the first address to the memory and the first buffer means to receive the first portion of the first data from the memory, and then (2) the first address generation means to generate the second memory address from the first address to the memory and the first buffer means to receive the second portion of the first data from the memory, wherein during the write operation, the control means causes (3) the second address generation means to generate the third memory address from the second address to the memory and the second buffer means to send the third portion of the second data to the memory, and then (4) the second address generation means to generate the fourth memory address from the second address to the memory and the second buffer means to send the fourth portion of the second data to the memory.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
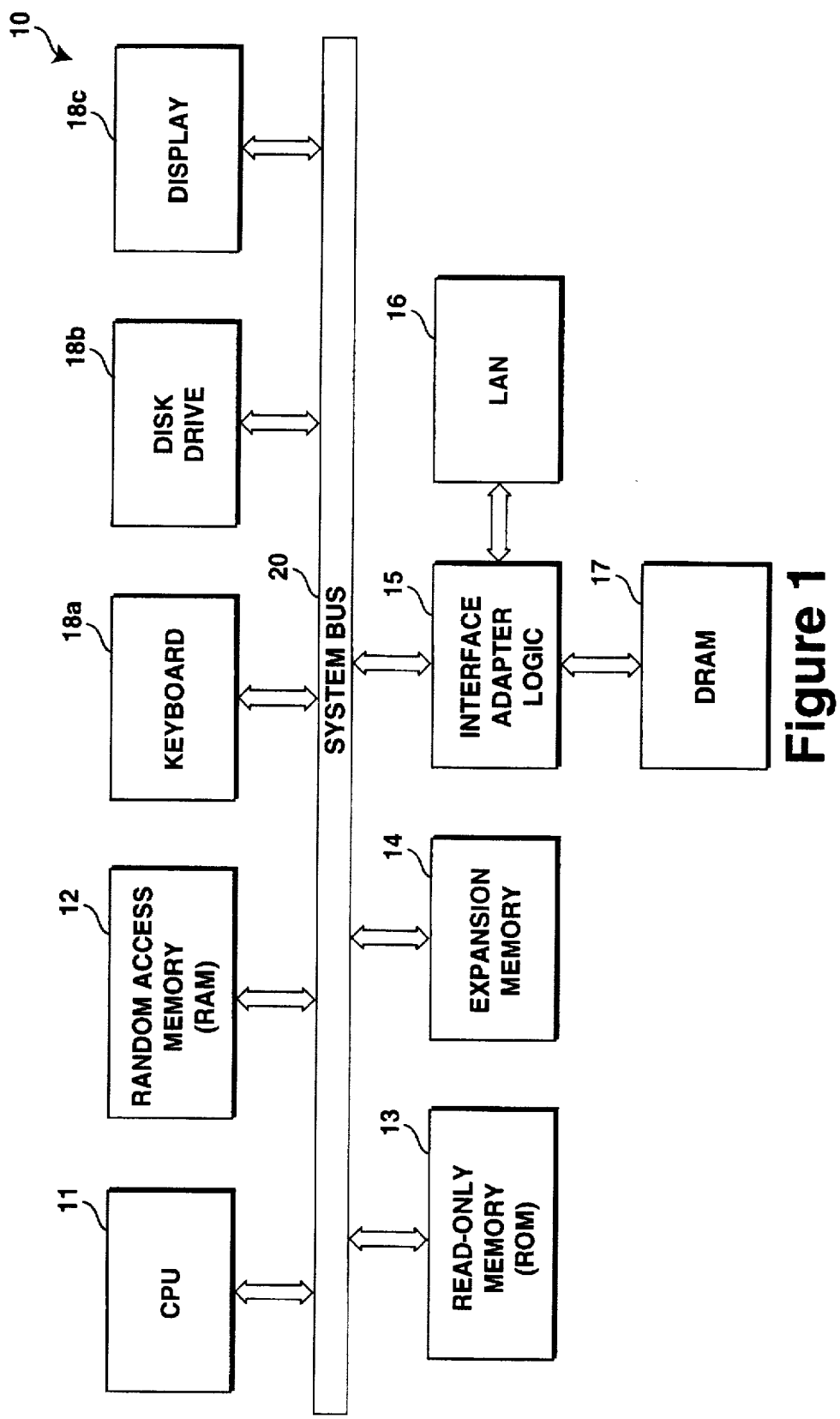
FIG. 1 is a block diagram of a computer system that includes a DRAM, a bus, and an interface adapter logic coupled between the DRAM and the bus.

FIG. 1 schematically illustrates in block diagram form the architecture of a microprocessor based computer system 10, which implements a preferred embodiment of the present invention. In one embodiment, computer system 10 is a personal computer system. In other embodiments, computer system 10 can be any other computer systems.

In the presently preferred embodiment, computer system 10 employs an Industry Standard Architecture ("ISA"). The ISA architecture is a 16-bit computer architecture. In alternative embodiments, computer system 10 can be of any other types of architectures. For example, computer system 10 can employ an Extended Industry Standard Architecture ("EISA"). The EISA architecture is a high performance 32-bit computer architecture based on the ISA architecture.

Computer system 10 includes a CPU 11. In one embodiment, CPU 11 typically includes a microprocessor, a co-processor, a cache, and a cache controller for handling access to the cache by the microprocessor. In alternative embodiments, more or fewer elements than above mentioned may be included in CPU 11. For example, CPU 11 may only include the microprocessor. In a further embodiment, the elements mentioned above may reside on a single semiconductor substrate.

In one embodiment, CPU 11 comprises an 80386 family microprocessor (i.e., i386™ CPU) manufactured by Intel Corporation of Santa Clara, Calif. In another embodiment, CPU 11 comprises an 80486 family microprocessor (i.e., i486™ CPU) also manufactured by Intel Corporation.

CPU 11 has a data path width that can be of 8 bits, 16 bits, or 32 bits. In one preferred embodiment, CPU 11 has a data path width of 16 bits. In other embodiments, CPU 11 can have a data path width of 8 or 32 bits.

CPU 11 is coupled to a system bus 20 of computer system 10. System bus 20 is employed in computer system 10 as the backplane bus for transfer of data among various components of computer system 10. System bus 20 adopts the data path width of CPU 11.

In the presently preferred embodiment, system bus 20 is an ISA bus. An ISA bus is a type of bus used in the ISA compatible computers. In alternative embodiments, system bus 20 can be of other types of system buses. For example, system bus 20 can be an EISA bus (i.e., Extended ISA bus). The EISA bus is a superset of the ISA bus.

Computer system 10 also includes a random access memory ("RAM") 12 and a read only memory ("ROM") 13. Both RAM 12 and ROM 13 are coupled to system bus 20. CPU 11 uses system bus 20 to access RAM 12 and ROM 13. RAM 12 and ROM 13 can have the same data path width as that of CPU 11. RAM 12 and ROM 13 can also have a data path width which is wider than that of CPU 11. In one embodiment, the data path width of RAM 12 and ROM 13 is the same as that of CPU 11. In another embodiment, the data path width of RAM 12 and ROM 13 is wider than that of CPU 11.

RAM 12 is used in computer system 10 for storing application programs and data, including system parameters and configuration information. ROM 13 is used in computer system 10 for storing system programs for system initialization and management. Both RAM 12 and ROM 13 are accessed via system bus 20.

Computer system 10 also includes an expansion memory 14. Expansion memory 14 may comprise an expansion RAM and/or an expansion ROM. Expansion memory 14 is used to expand the storage capacity of computer system 10. Expansion memory 14 is the expansion of RAM 12 and/or ROM 13. Expansion memory 14 can also be accessed via system bus 20. Expansion memory 14, like RAM 12 and ROM 13, also has the same data path width as that of CPU 11. Alternatively, computer system 10 may not comprise expansion memory 14.

Computer system 10 also includes a keyboard 18a, a disk driver 18b, and a display 18c. All of components 18a–18c are coupled to system bus 20. Components 18a–18c are peripheral devices. Keyboard 18a is used to input data into computer system 10. Keyboard 18a can also include cursor control devices, such as a mouse or a trackball. Disk driver 18b is used to access the disk storage medium, such as a floppy disk. In computer system 10, a hard disk is coupled to and accessed by a hard disk controller, which will be described below. Display 18c is used in computer system 10 to illustrate the output data of computer system 10.

Computer system 10 also includes other peripheral devices (not shown) that are connected to system bus 20. These other peripheral devices may include a MODEM, a serial communication controller, a hard disk controller, and a parallel communication controller. The parallel communication controller is typically coupled to a printer. The parallel communication controller controls access to the printer.

Referring again to FIG. 1, computer system 10 further includes a interface adapter logic 15. Interface adapter logic 15 is used in computer system 10 to interface a peripheral device to system bus 20. In the presently preferred embodiment, a LAN 16 is coupled to interface adapter logic 15. In alternative embodiments, other peripheral devices can be connected to interface adapter logic 15. For example, interface adapter logic 15 can be connected to a facsimile MODEM or a parallel communication controller.

In one embodiment, LAN 16 is an Ethernet™ network employing Ethernet™ transmission protocol and cabling. In alternative embodiments, LAN 16 can be of some other types of networks, such as fiber distributed data interface ("FDDI") network or Token Ring network.

Interface adapter logic 15 is also coupled to a DRAM 17. DRAM 17 is provided for interface adapter logic 15 to buffer the data transmitted to and from LAN 16. Therefore, DRAM 17 acts as the buffering storage of interface adapter logic 15. When one of the other components of computer system 10 desires to send a packet of data to LAN 16, interface adapter logic 15 first receives the data packet one word (i.e., 16 bits) at a time from system bus 20 and stores each word of the data packet to be transferred to LAN 16 in DRAM 17. After interface adapter logic 15 completes its receipt of the data packet to be transferred to LAN 16, interface adapter logic 15 releases system bus 20 such that other components of computer system 10 can use bus 20 for data transfer.

Interface adapter logic 15 then retrieves the data packet from DRAM 17 and sends the data packet to LAN 16 serially.

When LAN 16 needs to send a data packet to one of the components of computer system 10, interface adapter logic 15 first receives the data packet serially and stores the data packet in DRAM 17. Interface adapter logic 15 then gains the access of system bus 20 and sends the data packet to its destination from DRAM 17 via system bus 20, one word at a time.

DRAM 17, in the presently preferred embodiment, comprises a single DRAM device. DRAM 17 has a data path width different than that of system bus 20. In the presently preferred embodiment, the data path width of DRAM 17 is 4 bits wide.

In the presently preferred embodiment, DRAM 17 is a 256K×4 DRAM. In alternative embodiments, DRAM 17 can be of other sizes. For example, DRAM 17 can be a 64K×4 DRAM. As a further example, DRAM 17 can be a 1M×4 DRAM.

Because of the different data path widths between system bus 20 and DRAM 17, interface adapter logic 15 is required to convert the data transferred between DRAM 17 and system bus 20. For example, when a data of 16 bits is to be stored in DRAM 17 from system bus 20, interface adapter logic 15 converts the data into four 4-bit data and stores each of the four 4-bit data into DRAM 17, respectively. When a data of 16 bits is to be transferred to system bus 20 from DRAM 17, interface adapter logic 15 accesses DRAM 17 four times to obtain four 4-bit data from DRAM 17 and compiles them into the 16 bit data to be sent to system bus 20.

Figure 2:
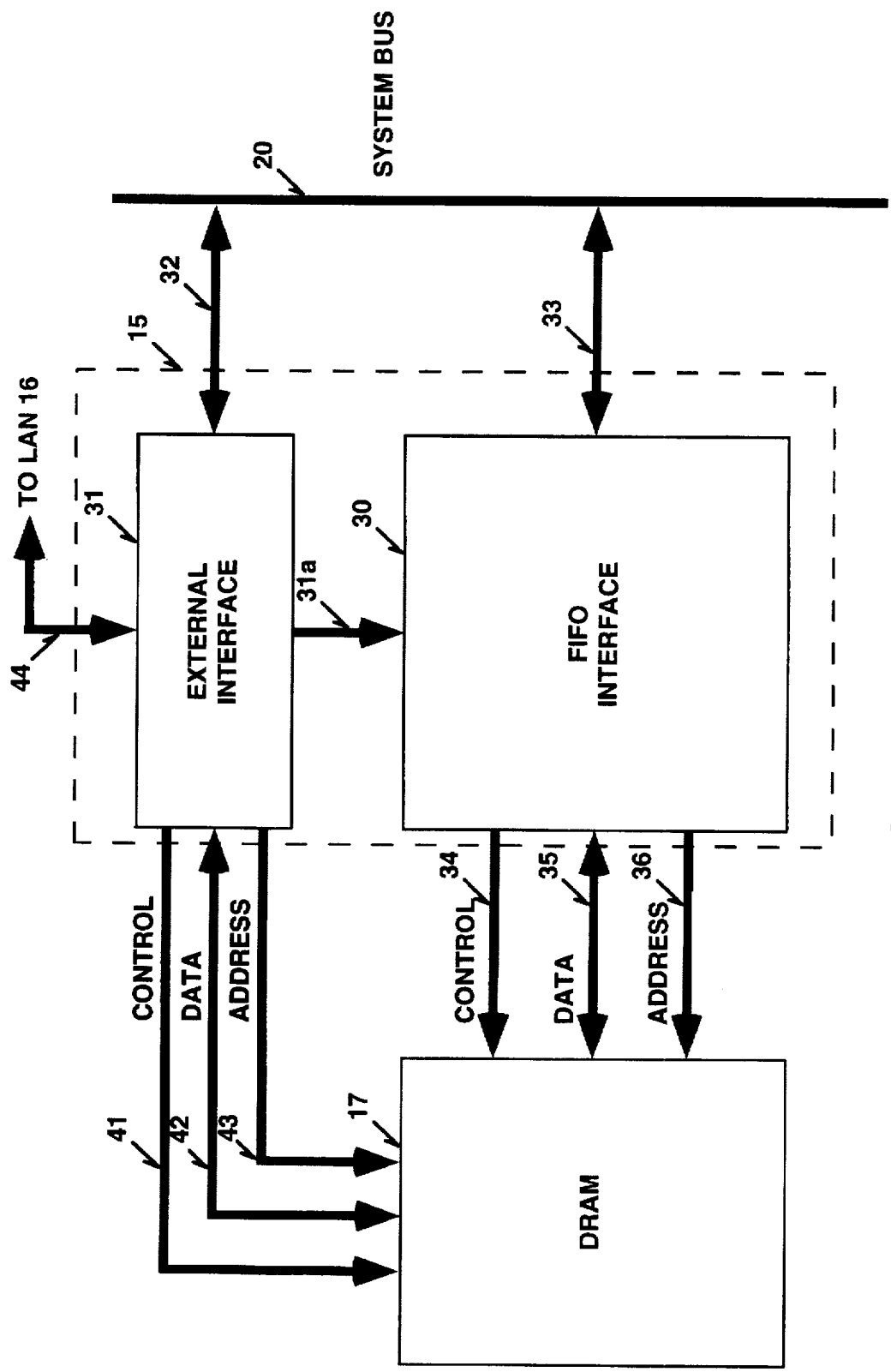
FIG. 2 is a block diagram of part of the interface adapter logic shown in FIG. 1 which is coupled between the bus and the DRAM, wherein the interface adapter logic includes a first-in-first-out (FIFO) interface.

Referring now to FIG. 2, a block diagram of interface adapter logic 15 is shown which includes a FIFO interface 30 and an external interface 31, according to one preferred embodiment of the present invention. FIFO interface 30 connects DRAM 17 to system bus 20. FIFO interface 30 is coupled to system bus 20 via bus 33. Bus 33 includes a data bus, an address bus, and a command and control signal bus.

FIFO interface 30 is the interface between system bus 20 and DRAM 17. FIFO interface 30 is coupled to DRAM 17 via a control bus 34, a data bus 35, and an address bus 36.

FIFO interface 30 performs the function of converting the data transferred between DRAM 17 and system bus 20 in interface adapter logic 15. The circuit of FIFO interface 30 will be described in more detail below, in conjunction with FIGS. 3–14.

External interface 31 is the interface of interface adapter logic 15 to LAN 16 (FIG. 1). External interface 31 is connected to LAN 16 via bus 44.

External interface 31 is connected to system bus 20 via bus 32. External interface 31 is connected to DRAM 17 via a control bus 41, a data bus 42, and an address bus 43. External interface 31 is also connected to FIFO interface 30 via line 31a. External interface 31 receives commands and control signals from system bus 20 via bus 32. External interface 31 also sends commands and control signals to system bus 20 via bus 32. External interface 31 receives data from LAN 16 and stores the data in DRAM 17 via buses 41–43. External interface 31 also retrieves data from DRAM 17 and transmits the data to LAN 17.

Figure 3:
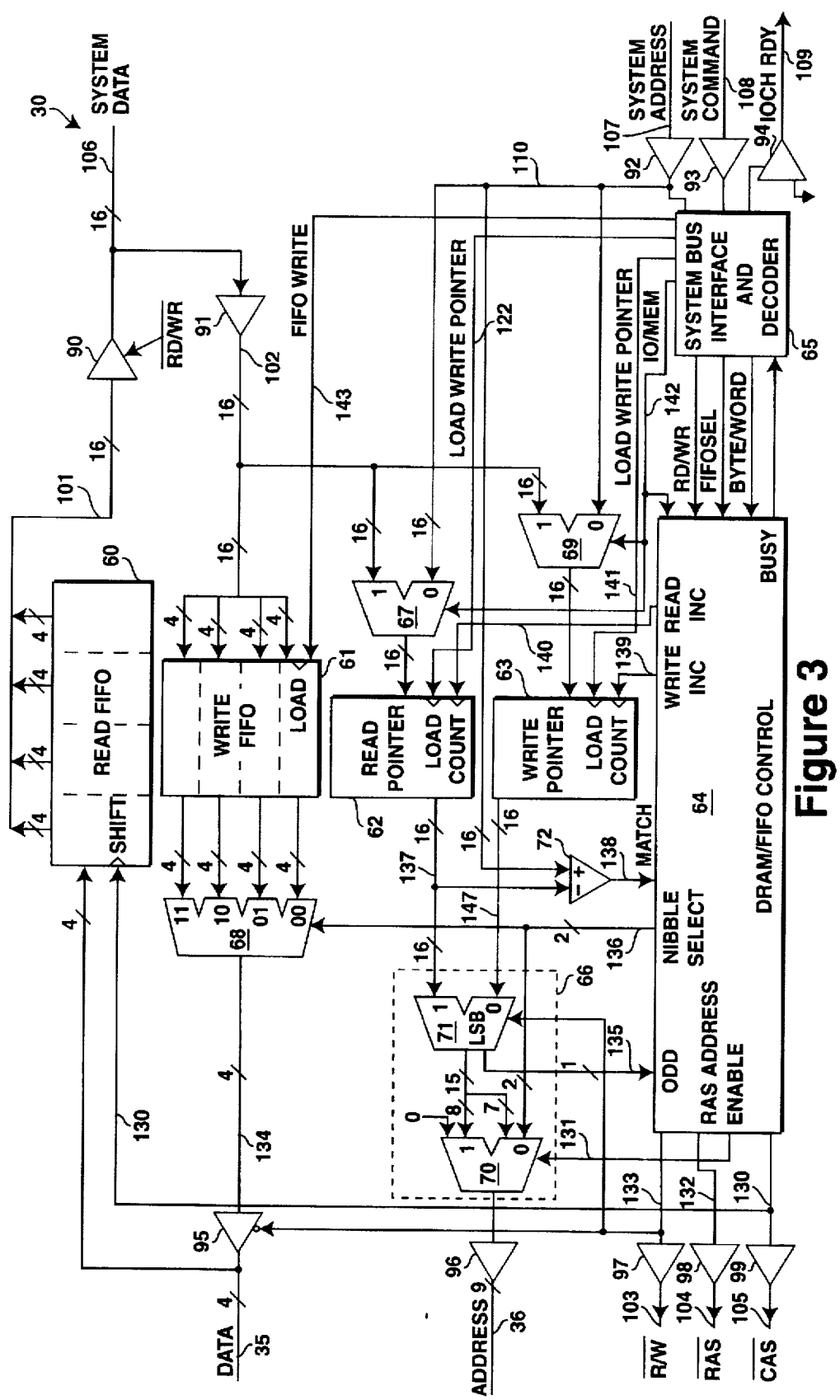
FIG. 3 is a block diagram of the FIFO interface of FIG. 2, including a DRAM/FIFO control circuitry.

Referring to FIG. 3, a block diagram of FIFO interface 30 is shown which includes a read FIFO register 60, a write FIFO register 61, a read pointer 62, a write pointer 63, a DRAM/FIFO control circuitry 64, and a system bus interface and decoder circuitry 65. In addition, FIFO interface 30 includes an address generation circuit 66.

As shown in FIG. 3, FIFO interface 30 is coupled to DRAM 17 (FIG. 2) via data bus 35, address bus 36, and control signal buses 103–105. Data bus 35 is a 4-bit bi-directional bus which transfers data between DRAM 17 and FIFO interface 30. Address bus 36 is a 9-bit bus that transmits DRAM addresses to DRAM 17. Control signal bus 103 sends a $\overline{R/W}$ signal to DRAM 17 which indicates whether the current DRAM access is a read or a write operation. Bus 104 sends a row address strobe $\overline{RAS}$ signal to DRAM 17 and a column address strobe $\overline{CAS}$ signal is sent to DRAM 17 via bus 105. Each $\overline{RAS}$ signal latches a row address to DRAM 17 via bus 36 and each $\overline{CAS}$ signal latches a column address to DRAM 17.

FIFO interface 30 is coupled to system bus 20 via a system data bus 106, a system address bus 107, and a system command bus 108. Buses 106–108 are part of bus 33 (FIG. 2). System data bus is a 16-bit bi-directional bus. System data bus 106 is used to transmit data between FIFO interface 30 and system bus 20 when FIFO interface 30 is in a memory mapped mode and is used to transmit data to and from register 61 and DRAM addresses to pointers 62 and 63 when FIFO interface 30 is in an I/O mapped mode. System address bus 107 is used to transmit DRAM addresses to pointers 62 and 63 to address DRAM 17 when FIFO interface 30 is in a memory mapped mode. System address bus 107 is used to provide register and pointer addresses to access registers 60–61 and pointers 62–63, respectively.

FIFO interface 30 can be operated in either the memory mapped mode or the I/O mapped mode. When FIFO interface 30 is operating in the memory mapped mode, the address space of DRAM 17 is mapped into the memory map of computer system 10. In this case, each storage location of DRAM 17 can be directly addressed with a system address received via system address bus 107.

When FIFO interface 30 is operating in the I/O mapped mode, the address space of DRAM 17 is not mapped into the memory map of computer system 10. Instead, only registers 60–61 and pointers 62–63 of FIFO interface 30 are addressed locations by the system addresses received via system address bus 107. Therefore, DRAM 17 cannot be directly addressed by the system address via system address bus 107 when FIFO interface 30 is in the I/O mapped mode. In the I/O mapped mode, read FIFO register 60 can be addressed by the system address via system address bus 107 to read the data stored in the register to system data bus 106. In addition, write FIFO register 61 can be addressed by the system address via system address bus 107 to receive a data to be written into the register from system data bus 106. Read and write pointers 62–63 can also be addressed in the I/O mapped mode by the system address via system address bus 107 to load a DRAM address for addressing DRAM 17 from system data bus 106. Therefore, registers 60–61 and pointers 62–63 are four separate addressing locations in computer system 10 when FIFO interface 30 is in the I/O mapped mode.

FIFO interface 30 is controlled to operate in one of the memory mapped mode and the I/O mapped mode. To accomplish this, a configuration bit (not shown) or register is set in system bus interface and decoder circuitry 65 that can be programmed to indicate in which one of the memory mapped mode and the I/O mapped mode FIFO interface 30 is currently operating.

There are two types of data transfers in FIFO interface 30. When a component on the side of system bus 20 (typically CPU 11) attempts to have a data transaction with one of registers 60–61 and pointers 62–63, or with DRAM 17 via FIFO interface 30, the data transfer is referred to as system bus transfer. When FIFO interface 30 is involved in a data transfer with DRAM 17, it is referred to as FIFO transfer or DRAM/FIFO transfer.

Read FIFO register 60 is a 16-bit shift register. Read FIFO register 60 stores data read from DRAM 17. Read FIFO register 60 includes four shifting stages, each being 4 bits wide. Each stage of register 60 has an output of 4 bits. The outputs of read FIFO register 60 are coupled to a data bus 101. Read FIFO register 60 is coupled to data bus 35 for receiving data from DRAM 17 (FIGS. 1 and 2). Data bus 35 sends data to read FIFO register 60 from DRAM 17. Data bus 35 also receives data for DRAM 17 from write FIFO register 61 via multiplexer 68 and driver 95. Data bus 101 is a 16-bit data bus. Data bus 101 is coupled to system data bus 106 via a driver 90.

System data bus 106 also sends data to write FIFO register 61, read pointer 62, and write pointer 63 via data bus 102 and driver 91, which will be described in more detail below. Data bus 102 is also 16 bits wide. Driver 90 is controlled by a $\overline{RD/WR}$ signal to connect data bus 101 to system data bus 106. The $\overline{RD/WR}$ signal is a read and write indicator. When the data stored in register 60 is to be read out, the $\overline{RD/WR}$ signal turns on driver 90 to couple data bus 101 to system data bus 106 such that the data in read FIFO register 60 can be transmitted to system data bus 106. When the current operation does not involve reading the data in read FIFO register 60, the $\overline{RD/WR}$ signal turns off driver 90 to disconnect bus 101 to system data bus 106 such that the data from system data bus 106 can be written into one of write FIFO register 61, read pointer 62, and write pointer 63.

Read FIFO register 60 receives the $\overline{CAS}$ signal from DRAM/FIFO control circuitry 64 via line 130. The $\overline{CAS}$ signal is applied at the shift input of read FIFO register 60 as the shift signal of register 60. The $\overline{CAS}$ signal controls the shift of read FIFO register 60. At each rising edge of the $\overline{CAS}$ signal, read FIFO register 60 shifts the data stored 4 bits per stage. If only a byte-wide (i.e., 8 bits) data is read from DRAM 17 by using two $\overline{CAS}$ strobes, then the byte-wide data stored in the first two stages of read FIFO register 60 is outputted on the entire data bus 101. This means that the byte-wide data is replicatively transmitted on the high and low bytes of data bus 101.

Write FIFO register 61 is a 16-bit register divided into four divisions, each being 4 bits wide. Write FIFO register 61 is coupled to receive the data from system data bus 106 via driver 91 and data bus 102. Each of the four divisions of register 61 stores a 4-bit portion of the data to be stored in write FIFO register 61. Write FIFO register 61 stores data to be written into DRAM 17. Write FIFO register 61 receives a FIFO WRITE signal at its load input via line 143 from system bus interface and decoder circuitry 65. The FIFO WRITE signal controls the load of the data from data bus 102 into register 61.

Write FIFO register 61 includes four outputs, each being 4 bits wide and for one of the four divisions of the register. The four outputs of write FIFO register 61 are all coupled to a write multiplexer 68. Write multiplexer 68 is a one-out-of-four multiplexer. Write multiplexer 68 consecutively and respectively couples the four outputs of write FIFO register 61 to data bus 35 via driver 95 during the write operation of DRAM 17, one at a time. Write multiplexer 68 receives a NIBBLE SELECT signal from DRAM/FIFO control circuitry 64 via line 136. The NIBBLE SELECT signal controls write multiplexer 68 to select one of the outputs of register 61 at one time. The NIBBLE SELECT signal is a two-bit signal and line 136 is 2 bits wide.

When system bus 20 writes a byte-wide (i.e., 8 bits) data to DRAM 17 via write FIFO register 61 of FIFO interface 30, the data is duplicated on the high and low bytes of system data bus 106. This in turn causes the data to be duplicately stored in write FIFO register 61, occupying the high and low bytes of the register. When write FIFO register 61 receives a byte-wide data, the NIBBLE SELECT signal will control write multiplexer 68 to selectively couple the outputs of either the high byte or the low byte of register 61. This will be described in more detail below, in connection with the description of DRAM/FIFO control circuitry 64.

Read pointer 62 is a 16-bit loadable counter. Read pointer 62 receives a DRAM address from system address bus 107 via bus 110 when FIFO interface 30 is in the memory mapped mode, and receives a DRAM address from system data bus 106 when FIFO interface 30 is in the I/O mapped mode. Read pointer 62 receives a LOAD READ POINTER signal from system bus interface and decoder circuitry 65 to load the DRAM address from either system data bus 106 or system address bus 107.

The DRAM address stored in read pointer 62 is used to address DRAM 17 during a read operation. The DRAM address in read pointer 62 can be incremented by a READ INC signal applied at its COUNT input. The READ INC signal is supplied from DRAM/FIFO control circuitry 64 via line 140.

The DRAM address stored in read pointer 62 is 16 bits wide which represents the addressing capacity of 64K bytes or 32K words (i.e., 16 bits) in DRAM 17. In the I/O mapped mode, read pointer 62 is addressed by the address received from system address bus 107 to load the DRAM address from bus 106. After the read operation from DRAM 17 is complete, the address in read register 62 is incremented to access the next locations of DRAM 17. In this way, DRAM 17 can be continuously and consecutively addressed. The READ INC signal is received in read pointer 62 one time after a byte read, two times after a word read. The READ INC signal is also applied to read pointer 62 in the memory mapped mode. This is referred to as "read ahead," which will be described in more detail below.

Alternatively, read pointer 62 is not used during a read operation when FIFO interface 30 is in the memory mapped mode. The DRAM address received via system address bus 107 can be directly applied to address generation circuit 66.

In the read ahead embodiment, a read address is previously stored in read pointer 62 and a data read from DRAM 17 by the address is already stored in read pointer 62. When a DRAM read transfer occurs, the read address is first compared with the one already in read pointer 62 in a comparator 72. When the addresses are identical, comparator 72 outputs a MATCH signal to DRAM/FIFO control circuitry 64. Circuitry 64 then controls not to load the read address in read pointer 62 and not to access DRAM 17. DRAM/FIFO control circuitry 64 also notifies that the data based on the read address is available in read FIFO register 60 by not activating the BUSY signal. Therefore, the IOCHRDY signal is not activated to extend the system bus cycle. After the operation, the address in read pointer 62 is incremented, and data at that address is then read from DRAM 17 to register 60.

If comparator 72 does not output the MATCH signal, then the read address is loaded into read pointer 62, superseding the address already in the pointer and DRAM 17 is then accessed. In this case, the BUSY signal is activated which in turn asserts the IOCHRDY signal.

In an alternative embodiment, read pointer 62 is not incremented by the READ INC signal in the memory mapped mode.

A multiplexer 67 is coupled between (1) read pointer 62 and (2) system data bus 106 and system address bus 107 to selectively coupled one of buses 106-107 to read pointer 62. When FIFO interface 30 is in the memory mapped mode, multiplexer 67 couples bus 107 to read pointer 62 via bus 110. When FIFO interface 30 is in the I/O mapped mode, multiplexer 67 couples bus 10 to read pointer via bus 102. Multiplexer 67 is controlled by an IO/MEM signal from circuitry 65 via line 42 to make the selection. The IO/MEM signal indicates whether FIFO interface 30 is in the memory mapped mode or the I/O mapped mode. The output of read pointer 62 is then coupled to address generation circuit 66 via line 137.

Write pointer 63 is a 16-bit loadable counter. Write pointer 63 receives a DRAM address from system address bus 107 via bus 110 and a multiplexer 69 when FIFO interface 30 is in the memory mapped mode, and receives a DRAM address from system data bus 106 via bus 102 and multiplexer 69 when FIFO interface 30 is in the I/O mapped mode. Write pointer 63 receives a LOAD WRITE POINTER signal from system interface and decoder circuitry 65 to load the DRAM address from either system data bus 106 or system address bus 107. The output of write pointer 63 is coupled to address generation circuitry 66 via line 147.

The address stored in write pointer 63 is used to address DRAM 17 during a write operation. The address stored in pointer 63 is also 16 bits wide which represents the addressing ability of 64K byte or 32K words in DRAM 17. In I/O mapped mode, the address is incremented by a WRITE INC signal applied to its COUNT input from DRAM/FIFO control circuitry 64 via line 139 after the write to DRAM 17 is complete. Thus, the next locations of DRAM 17 can be addressed. Pointer 63 is incremented one time by the WRITE INC signal after a byte write, twice by the WRITE INC signal after a word write. Pointer 63 is, however, not incremented in the memory mapped mode.

Multiplexer 69 selects the address from either of buses 106 and 107. When FIFO interface 30 is in the I/O mapped mode, multiplexer 69 selects bus 106 to load the address to write pointer 63. When FIFO interface 30 is in the memory mapped mode, multiplexer 69 selects bus 107 to load the address to write pointer 63. Multiplexer 69 is also controlled by the IO/MEM signal via line 142.

Address generation circuit 66 includes two multiplexers 70 and 71. Address generation circuit 66 receives a 16-bit address from either of pointers 62 and 63. Address generation circuit 66 then converts the 16-bit address into a row address and a column address, each being 9 bits wide. The upper byte of the address plus a constant "0" as the most significant bit form the row address of DRAM 17 at multiplexer 70. The row address is latched into DRAM 17 at the $\overline{RAS}$ signal. The lower byte of the address, except the least significant bit (i.e., LSB), is then coupled to the other input of multiplexer 70 to form the column address of DRAM 17 with the two bit NIBBLE SELECT signal. The LSB bit is coupled from multiplexer 71 to DRAM/FIFO control circuitry 64 to become an ODD signal. The ODD signal informs control circuitry 64 whether the address is an odd address or an even address.

Multiplexer 71 determines to take the output of which one of pointers 62–63. Multiplexer 71 receives the $\overline{R/W}$ signal for the determination. When the transfer is a read operation, the $\overline{R/W}$ signal controls multiplexer 71 to select the output of read pointer 62. When the transfer is a write operation, the $\overline{R/W}$ signal controls multiplexer 71 to select the output of write pointer 63.

Because the most significant bit of the row address is always "0," only half of the address locations in DRAM 17 can be addressed. Therefore, DRAM 17 has its upper half not used.

Multiplexer 70 is controlled by a RAS ADDRESS ENABLE signal from control circuitry 64 to selectively couple the row address or the column address to bus 36. When the RAS ADDRESS ENABLE signal is at logical high, indicating that the $\overline{RAS}$ signal is applied to DRAM 17, multiplexer 70 couples the row address. When the RAS ADDRESS ENABLE signal is at logical low, indicating that the $\overline{RAS}$ signal is not applied, multiplexer 70 applies the column address to DRAM 17 via bus 36.

As described above, the FIFO transfer can involve a word-wide data or a byte-wide data. Whether the data being transferred is a byte-wide data or a word-wide data depends on the $\overline{BYTE/WORD}$ signal. When the FIFO transfer involves a word-wide data, the data word can be transferred in one word or two bytes. This is indicated by the ODD signal. When the word transfer is determined to be done in one word (i.e., ODD=0), DRAM/FIFO control circuitry 64 generates one RAS ADDRESS ENABLE strobe to multiplexer 70 to supply one row address to DRAM 17. In addition, circuitry 64 generates one $\overline{RAS}$ strobe to latch the row address to DRAM 17 and four $\overline{CAS}$ strobes to latch four column addresses to DRAM 17.

When the word of data is determined to be transferred in two bytes (i.e., ODD=1), DRAM/FIFO control circuitry 64 generates two RAS ADDRESS ENABLE strobes to multiplexer 70 to supply two row addresses to DRAM 17. In addition, circuitry 64 generates two $\overline{RAS}$ strobes and four $\overline{CAS}$ strobes to DRAM 17. The sequence of such two bytes transfer is as follows.

DRAM/FIFO control circuitry 64 first generate one RAS ADDRESS ENABLE strobe to supply the first row address, and generates a $\overline{RAS}$ strobe to latch the first row address to DRAM 17. Control circuitry 64 then generates two $\overline{CAS}$ strobes to DRAM 17 to supply two column addresses to DRAM 17. In this way, the first byte of the word-wide data is written into DRAM 17, 4 bits at a time and per one column address. Write pointer 63 is then incremented once by the WRITE INC signal.

Control circuitry 64 then generates another set of the RAS ADDRESS ENABLE signal, the $\overline{RAS}$ and $\overline{CAS}$ signals to write the second byte of the word-wide data to DRAM 17, thus completing the two-byte transfer.

When the transfer involves a word of data (i.e., 16 bits), the NIBBLE SELECT signal helps to generate four column addresses at multiplexer 70. When the transfer involves a single byte transfer, the NIBBLE SELECT signal helps to generate two column addresses at multiplexer 70. The NIBBLE SELECT signal changes during the course of the transfer.

DRAM/FIFO control circuitry 64 orchestrates the activities of the other circuits of FIFO interface 30, it generates the DRAM control signals $\overline{R/W}$, $\overline{RAS}$, and $\overline{CAS}$.

When a transfer is in progress, the BUSY signal is held active to system bus interface and decoder circuitry 65 and the FIFOSEL signal is ignored. When the BUSY signal is inactive which means that no FIFO transfer is in progress, a transfer begins when the FIFOSEL signal is active. The value of the $\overline{RD/WR}$ signal and the $\overline{BYTE/WORD}$ signal is saved for later use in the transfer. The $\overline{RD/WR}$ signal indicates whether the transfer is a read operation or a write operation. The $\overline{BYTE/WORD}$ signal indicates whether the transfer involves a word or a byte of data.

The $\overline{R/W}$ signal to DRAM 17 is then changed to the stored value of the $\overline{RD/WR}$ signal by DRAM/FIFO control circuitry 64. The RAS ADDRESS ENABLE signal is activated in control circuitry 64 to select the row address to DRAM 17 in multiplexer 70. After the RAS setup time, the $\overline{RAS}$ signal is activated (low). After the RAS hold time, the RAS ADDRESS ENABLE signal is deactivated to select the column address in multiplexer 70.

The NIBBLE SELECT signal from control circuity 64 controls the two least significant bits of the column address. This signal also selects which 4-bit portion of the data in write FIFO register 61 is to be transferred to DRAM 17 at the column address when the transfer is a write operation. The $\overline{BYTE/WORD}$ and ODD signals are used to determine the patterns of the NIBBLE SELECT signal, and the length of the DRAM transfer. The NIBBLE SELECT signal stays constant through each $\overline{CAS}$ cycle, and changes value on the rising edge of each $\overline{CAS}$ cycle.

When the $\overline{BYTE/WORD}$ signal is high, then only a byte of data is transferred to DRAM 17 and control circuitry 64 then generates two $\overline{CAS}$ cycles. If the ODD signal is inactive (i.e., ODD=0), then the NIBBLE SELECT signal will have the pattern "00" and "01," and only the lower byte of write FIFO register 61 is transferred to DRAM 17. If the ODD signal is active (i.e., ODD=1), the NIBBLE SELECT signal will then have the pattern "10" and "11," and the upper byte in write FIFO register 61 is transferred.

When the $\overline{BYTE/WORD}$ signal is low, then a word of data will be transferred to DRAM 17. The actual transfer of the word-wide data then depends on the ODD signal. If the ODD signal is inactive (i.e., ODD=0), then the word of data is transferred in one word (i.e., one $\overline{RAS}$ strobe and four $\overline{CAS}$ strobes). If the ODD signal is active (i.e., ODD=1), then the word of data is transferred in two bytes (i.e., one $\overline{RAS}$ strobe with two $\overline{CAS}$ followed by another $\overline{RAS}$ strobe with another two $\overline{CAS}$ strobes).

At the end of each DRAM transfer, the appropriate pointer can be incremented. If the transfer was a read (i.e., $\overline{RD/WR}$=1), the READ INC signal is activated to increment read pointer 62. If the transfer was a write ($\overline{RD/WR}$=0), the WRITE INC signal is activated to increment write pointer 63 in the I/O mapped mode. The stored value of the $\overline{BYTE/WORD}$ signal is used to determine the size of the last transfer. The selected pointer is incremented by one if the transfer was a byte, or by two if the transfer was a word transfer.

System bus interface and decoder circuitry 65 monitors the system bus activity of system bus 20. It also stores the configuration information of FIFO interface 30. For example, it stores the value of the IO/MEM signal that controls whether interface 30 is in the I/O mapped mode or the memory mapped mode. The IO/MEM signal is generated by the configuration bit that stores the information whether FIFO interface 30 is in the I/O mapped mode or the memory mapped mode. Circuitry 65 receives the status information of the current system bus transfer from system command bus 108 and generates the $\overline{BYTE/WORD}$ and $\overline{RD/WR}$ signals accordingly. When a system bus cycle is detected by circuitry 65, the circuitry asserts the IOCHRDY signal if it receives an active BUSY signal from control circuitry 64. When the BUSY signal becomes inactive, the circuitry deasserts the IOCHRDY signal. The IOCHRDY signal extends the current system bus cycle.

In the I/O mapped mode, registers 60–61 and pointers 62–63 are each mapped to unique I/O locations. Writes to a corresponding one of registers 60–61 and pointers 62–63 will activate the FIFO WRITE signal, the LOAD READ POINTER signal, or the LOAD WRITE POINTER signal. The FIFO writes receive data or addresses via system data bus 106. The FIFOSEL is not activated on the writes to write pointer 63, as no DRAM transfer should occur when write pointer 63 is loaded.

In the memory mapped mode, circuitry 65 receives the address via system address bus 107 and decodes the command information received via system command bus 108. If the current system bus transfer is a write to DRAM 17, the LOAD WRITE POINTER signal is activated by circuitry 65 to load the address via bus 110 into write pointer 63. The FIFO WRITE signal is also activated to store the data in write FIFO register 61 received via system bus 106 and bus 102. The FIFOSEL is activated to signal control circuitry 64 that a FIFO transfer is required and the $\overline{RD/WR}$ signal indicates that the transfer is a write. If the current system bus transfer is a read from DRAM 17, the IOCHRDY signal is activated when the MATCH signal from comparator 72 is not activated. The activated IOCHRDY signal extends the system bus cycle while the data is read from DRAM 17. The FIFOSEL signal is activated to signal control circuitry 64 to start the transfer. When the BUSY signal goes inactive, the IOCHRDY signal returns to inactive state to conclude the current system bus cycle.

In the I/O mapped mode, the WRITE INC and the READ INC signal are used for the series write operation or the series read operation. To conduct a series read, a beginning address is first loaded to read pointer 62 via bus 106. FIFO interface 30 then reads four 4-bit data in register 60 at the locations indicated by the address in read pointer 62. The address in read pointer 62 is then incremented by the READ INC signal twice to point to the locations of the next word of data stored in DRAM 17. The data in register 60 is read to system data bus 106. When the read from register 60 is complete, FIFO interface 30 begins another DRAM read to fill register 60. If at any time, read FIFO register 60 does not contain a complete data by the time system data bus 106 attempts to receive the data, the IOCHRDY signal will be asserted to extend the system bus cycle until the data is read from register 60.

To conduct a series write, a beginning address is first loaded in write pointer 63. When write FIFO register 61 receives a data, FIFO interface 30 starts to write the data to DRAM 17, 4 bits at a time. Write pointer 63 is then incremented by the WRITE INC signal to point to the next locations for the next data (once if the data is byte wide and twice if the data is word wide). The next data can then be loaded into register 61 to be written into DRAM 17. If at any time write FIFO register 61 still contains the data when the system bus transfer occurs to write the next data, the IOCHRDY signal is activated to extend the system bus cycle until the write of the data to DRAM 17 is complete.

In the memory mapped mode, the READ INC signal is used for the "read ahead" operation. Alternatively, FIFO interface 30 does not include the "read ahead" feature and the address is directly applied to address generation circuitry 66 in the memory mapped read operation. In this case, the READ INC signal is not used on the memory mapped read and the IOCHRDY signal is always used to extend the system bus cycles during the memory mapped read operation.

By having read FIFO register 60, write FIFO register 61, read and write pointers 62 and 63, DRAM/FIFO control circuitry 64, and system bus interface and decoder circuitry 65, FIFO interface 30 allows data to be transferred between system bus 20 and DRAM 17 that are of different data path widths. In FIFO interface 30 maintains good throughput of the transfer between system bus 20 and DRAM 17. Furthermore, FIFO interface 30 allows minimum system bus cycle time to transfer data to and from DRAM 17.

Figure 4:
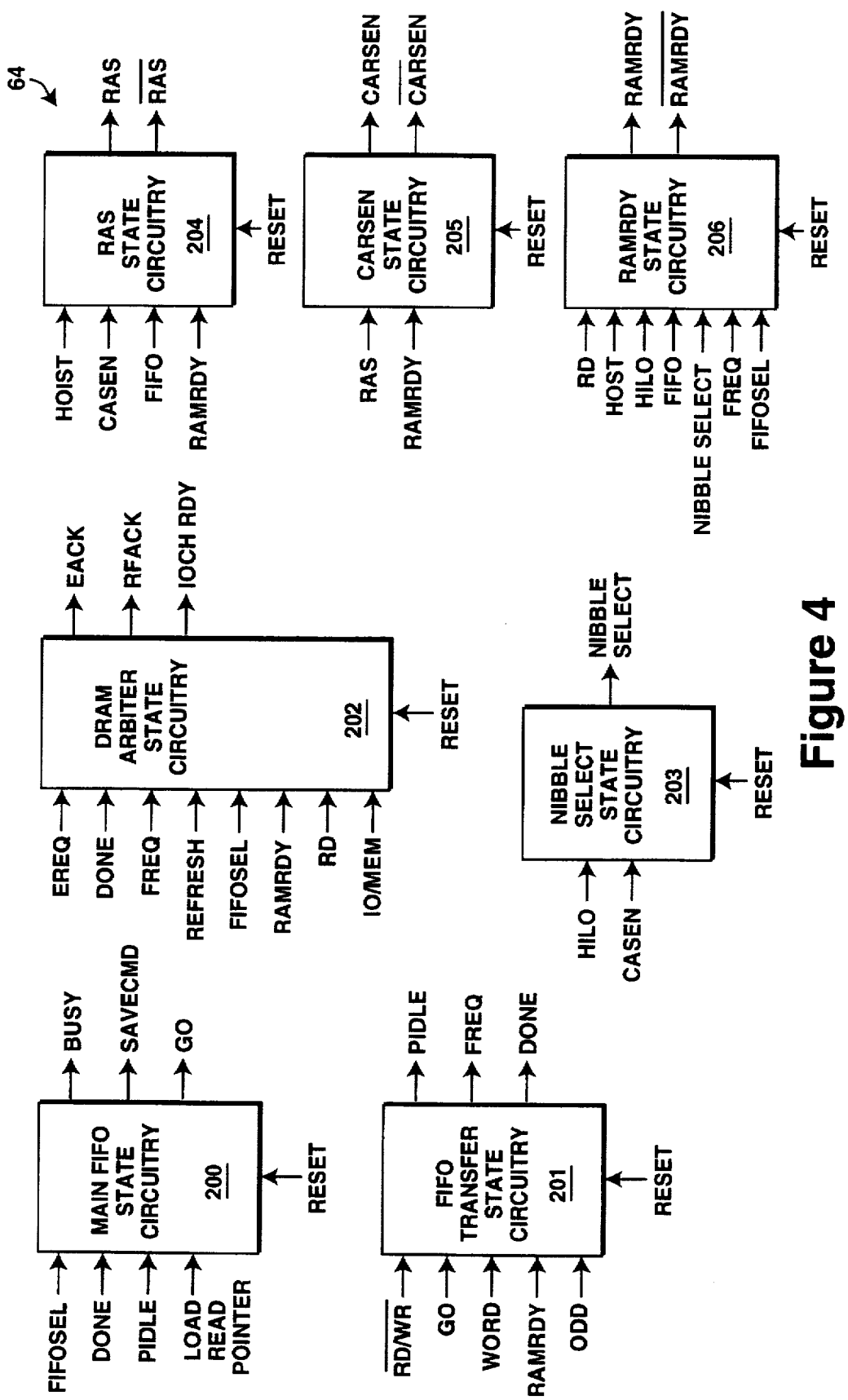
FIG. 4 is a block diagram of the DRAM/FIFO control circuitry of FIG. 3, including a main FIFO state circuitry, a FIFO transfer state circuitry, a DRAM arbiter state circuitry, a DRAM ready state circuitry, a RAS state circuitry, a CAS enable state circuitry, an a nibble select state circuitry.

FIG. 4 illustrates in block diagram form circuitry of DRAM/FIFO control circuitry 64. In FIG. 4, control circuitry 64 includes a main FIFO state circuitry 200, a FIFO transfer state circuitry 201, a DRAM arbiter state circuitry 202, a nibble select state circuitry 203, a RAS state circuitry 204, a CAS enable CASEN state circuitry 205, and a DRAM ready RAMRDY state circuity 206.

Main FIFO state circuitry 200 keeps track of the state of FIFO interface 30. Main FIFO state circuitry 200 initiates a FIFO transfer in accordance with a system bus transfer. Main FIFO state circuitry 200 also keeps track of whether FIFO interface 30 is busy with its FIFO transfer (i.e., BUSY=1) or idle. If FIFO interface 30 is already busy when the system bus transfer starts, then the system bus cycle must be extended by the IOCHRDY signal until FIFO interface 30 is ready for the system bus transfer.

FIFO transfer state circuit 201 controls the actual transfer of data between DRAM 17 and FIFO interface 30. FIFO transfer state circuitry 201 determines whether a data transfer should be in a byte, a word, or two bytes. At the end of the transfer, circuity 201 updates one of pointers 62–63 involved in the transfer.

DRAM arbiter state circuitry 202 arbitrates between the requesters that are requesting the access of DRAM 17. The function of DRAM arbiter state circuitry 202 is to make certain that only one requester accesses DRAM 17 at a time. The requestors may be from system bus 20 (i.e., HOST), FIFO interface 30 (i.e., FIFO), a refresh circuit (i.e., REFRESH), or external interface 31 (i.e., EXTERNAL). The refresh circuit is not shown in FIG. 4. The function of the refresh circuit is to periodically refresh DRAM 17. In the presently preferred embodiment, the refresh circuit counts a 15 μs time period. A the end of each 15 μs time period, the refresh circuit requests the access of DRAM 17. When acknowledgement is received from DRAM arbiter state circuitry 202, the refresh circuit activates the $\overline{CAS}$ signal, then the $\overline{RAS}$ signal. This is known as "CAS before RAS refresh." In this case, DRAM 17 supplies its own refresh addresses. The refresh circuit is located in FIFO interface 30, in the presently preferred embodiment.

DRAM arbiter state circuitry 202 receives an EREQ signal from external interface 31 (FIG. 2) via line 31a, a FREQ signal, a REFRESH signal from the refresh circuit and the FIFOSEL, $\overline{RD/WR}$, and IO/MEM signals from system bus interface and decoder circuitry 65. The EREQ signal indicates to arbiter state circuitry 202 that external interface 31 is requesting access to DRAM 17. The REFRESH signal indicates that the refresh circuitry of interface 30 is requesting access to refresh DRAM 17. The FREQ signal indicates that FIFO interface 30 is requesting a FIFO transfer with DRAM 17. When the $\overline{RD/WR}$ signal and the IO/MEM signal indicate that system bus 20 is requesting access to DRAM 17 (i.e., a memory mapped read operations), a request from system bus 20 is formed.

Nibble select state circuitry 203 generates the 2-bit NIBBLE SELECT signal that is applied to write multiplexer 68 and address generation circuit 66. Nibble select state circuitry 203 is transmitted between "00", "01", "10", and "11" states. Each state of nibble select state circuity 203 represents the output of the NIBBLE SELECT signal.

RAS state circuitry 204, CASEN state circuitry 205, and RAMRDY state circuitry 206 are DRAM state circuits that control the access of DRAM 17. These state circuits 204–206 will be described in more detail below, in conjunction with FIGS. 8–10.

Figure 5:
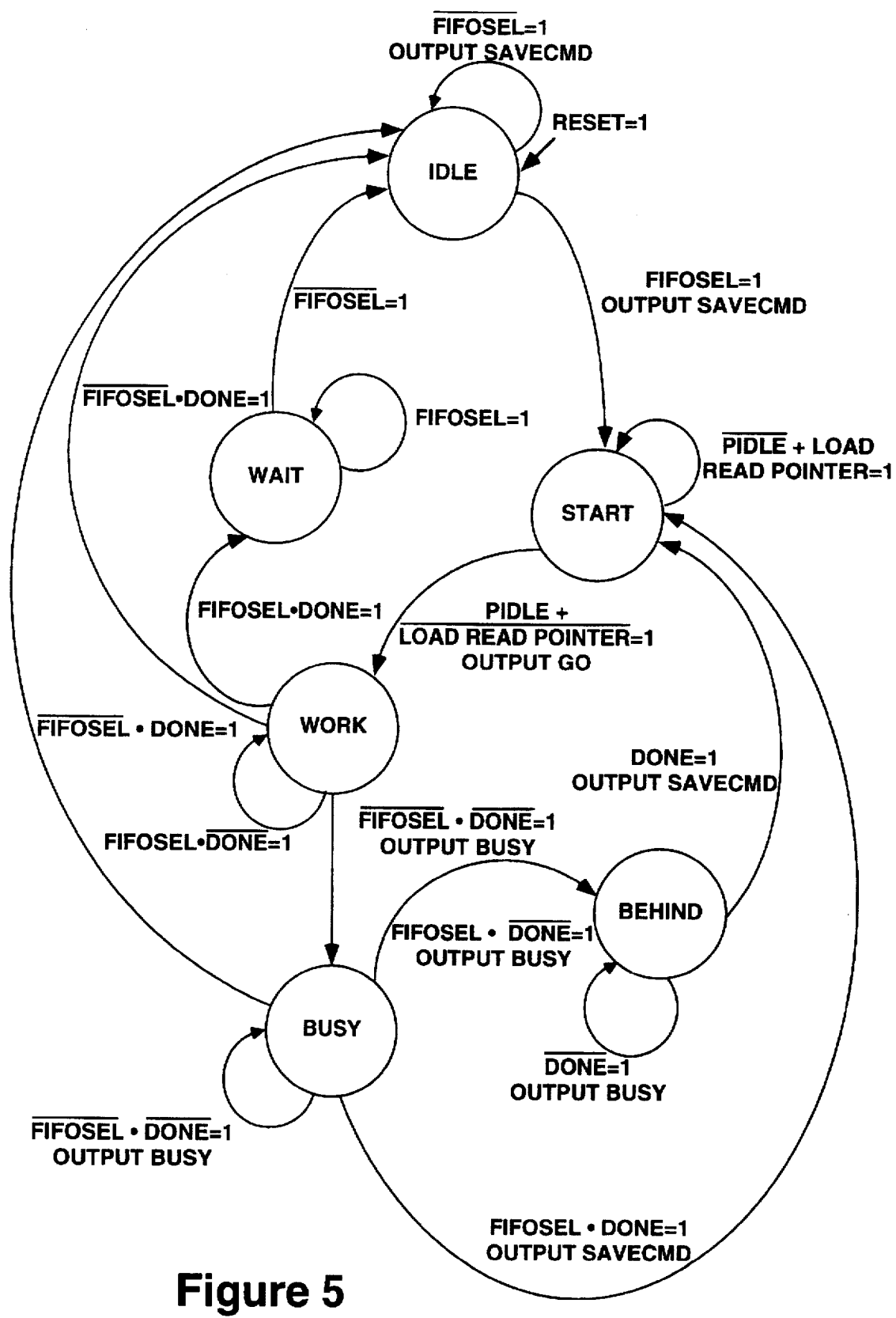
FIG. 5 is a state diagram of the main FIFO state circuitry of FIG. 4.

FIG. 5 is a state diagram, illustrating the states of main FIFO state circuitry 200 of FIG. 4. As can be seen from FIG. 5, main FIFO state circuitry 200 is initially reset to an "IDLE" state. In this state, main FIFO state circuitry 200 waits for CPU 11 to initiate a system bus transfer with one of registers 60–61 and pointers 62–63. The transfer can be a read from read FIFO register 60, a write to write FIFO register 61, a load to one of pointers 62 and 63 in the I/O mapped mode. In the memory mapped mode, the transfer can be read from DRAM 17 or a write to DRAM 17. The FIFOSEL input signal from system bus interface and decoder circuitry 65, when at logical high level, indicates that one of the above-mentioned events is occurring.

Alternatively, the FIFOSEL signal is not activated in the memory mapped read from DRAM 17. In this case, main FIFO state circuitry 200 is not used. The memory mapped read operation directly accesses DRAM state circuitry 203–206 and system bus interface and decoder circuitry 65 extends the host cycle with the IOCHRDY signal until the data has been read from DRAM 17.

When the FIFOSEL signal is active which indicates that one of the above-mentioned events is occurring (i.e., a system bus transfer), main FIFO state circuitry 200 activates the SAVECMD signal and moves to "START" state. The SAVECMD signal is used to latch status information of the system bus transfer that will only be available while the FIFOSEL signal is active. The information includes the $\overline{RD/WR}$ signal and the $\overline{BYTE/WORD}$ signal that indicates whether the data is a word-wide data or a byte-wide data. The $\overline{RD/WR}$ signal indicates whether the current operation is a read or write operation.

Main FIFO state circuitry 200 remains in the "START" state until FIFO transfer state circuit 201 is in a "PIDLE" state, which indicates that all pointer 62 and 63 contain the current addresses. If the FIFOSEL signal was activated by the LOAD READ POINTER signal that causes state circuitry 200 to come from the "IDLE" state, main FIFO state circuitry 200 must remain in the "START" state until the load is complete to assure that a valid address is in read pointer 62.

When FIFO transfer state circuitry 201 is in the "PIDLE" state or when the LOAD READ POINTER signal is low, main FIFO state circuitry 200 goes to "WORK" state to start a FIFO transfer based on the system bus transfer and the output GO signal is activated for one cycle to get FIFO transfer state circuitry 201 started. The GO signal indicates that it is currently quite all right to begin a FIFO transfer.

State circuity 200 then stays in the "WORK" state until the FIFO transfer has completed, or CPU 11 has completed the system bus transfer (FIFOSEL=0). The completion of the FIFO transfer is indicated by the active high DONE signal (i.e., DONE=1).

If the FIFO transfer is completed (i.e., DONE=1) while the system bus transfer is still active (i.e., FIFOSEL=1), the main FIFO state circuitry 200 goes to a "WAIT" state to wait for the end of the system bus transfer. When the system bus transfer is completed (i.e., FIFOSEL=0), the state circuitry then will return to the "IDLE" state. If the FIFO transfer completes at the same time the system bus transfer completes (i.e., DONE=1, FIFOSEL=0), state circuitry 200 will directly go to the "IDLE" state, skipping the "WAIT" state.

If the system bus transfer is complete (i.e., FIFOSEL=0) and the FIFO transfer is not yet complete (DONE=0), then state circuitry 200 goes from the "WORK" state to a "BUSY" state. In addition, the state circuitry 200 asserts the output signal BUSY in order to assert the IOCHRDY signal to system bus 20.

When main FIFO state circuitry 200 is in the "BUSY" state, it waits for FIFO interface 30 to complete its transfer with DRAM 17. CPU 11 at this time, however, may attempt to have another system bus transfer with FIFO interface 30. In this case, read FIFO register 60 may not fully filled (i.e., empty) and write FIFO register 61 may still contain the data to be written into DRAM 17 (i.e., full). Because main FIFO state circuitry 200 asserts the BUSY signal to system bus interface and decoder circuitry 65 (FIG. 3) in the "BUSY" state, circuitry 65 thus immediately asserts the inverted IOCHRDY signal IOCHRDY when CPU 11 attempts a transfer with FIFO interface 30. This then extends the CPU (i.e., host) cycle and gives FIFO interface 30 enough time to finish its transfer.

When CPU 11 does attempt a system bus transfer while FIFO interface 30 is busy with its transfer, main FIFO state circuitry 200 goes to a "BEHIND" state.

When the system bus transfer and the completion of the FIFO transfer occur at the same time (i.e., FIFOSEL=1 and DONE=1), state circuitry 200 skips the "BEHIND" state and goes directly to the "START" state from the "BUSY" state to begin another FIFO transfer. The SAVECMD signal is activated again to save the system bus transfer status.

If the FIFO transfer is completed before another system bus transfer is attempted, then state circuitry 200 goes to the "IDLE" state to wait for the next system bus transfer.

When state circuitry 200 transits from the "BUSY" state to the "BEHIND" state, the attempted system bus transfer is extended by asserting the BUSY signal (and therefore the IOCHRDY signal) until the FIFO transfer is complete (i.e., DONE=1). State circuitry 200 then goes to the "START" state to begin the next FIFO transfer. In addition, the BUSY signal is deactivated to allow the system bus transfer to be complete. The SAVECMD is activated to save the system bus transfer status.

The "WAIT" state is reached when FIFO interface 30 completes its DRAM transfer (i.e., FIFO transfer) while the system bus transfer is still in progress. When the system bus transfer is completed (i.e., FIFOSEL=0), state circuitry 200 then returns to the "IDLE" state.

Figure 12:
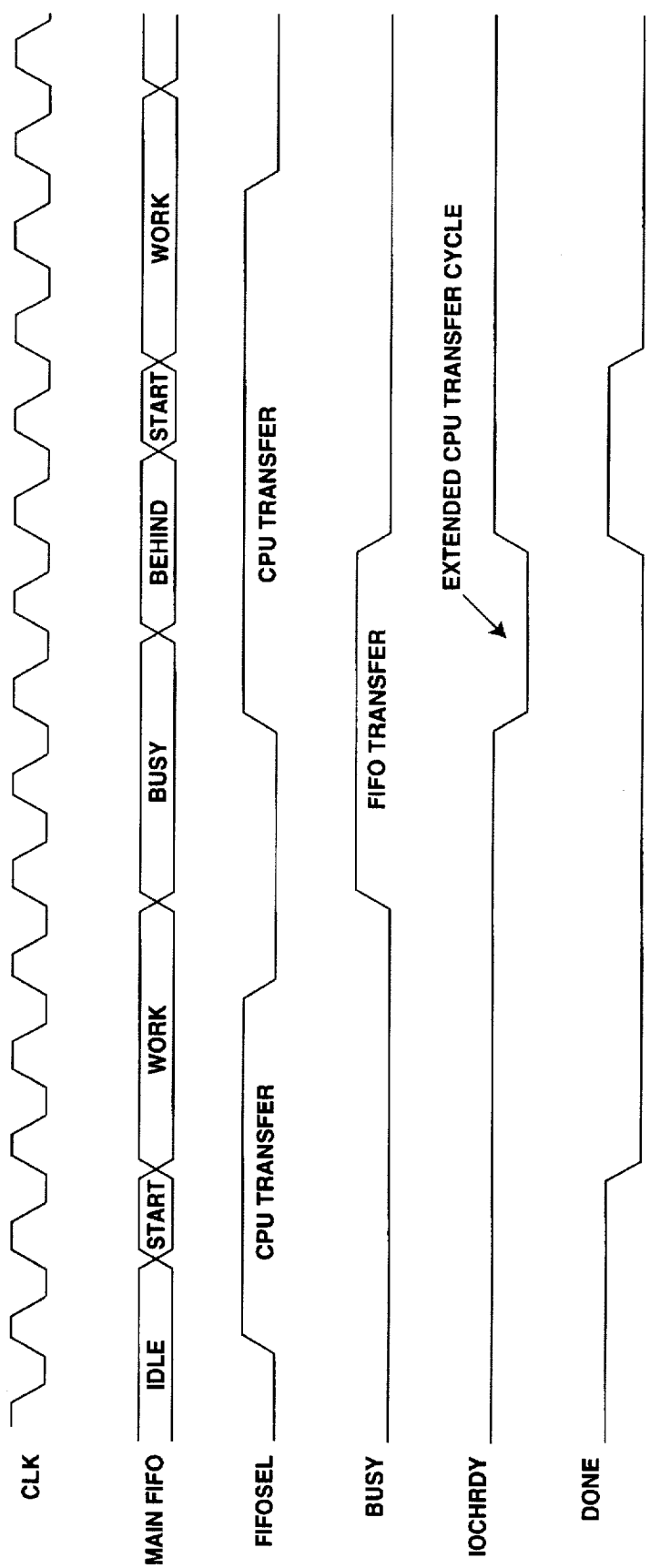
FIG. 12 is a timing diagram of the states of the main FIFO state circuitry of FIG. 4 and its related signals.

FIG. 12 illustrates in timing diagram form the states of main FIFO state circuitry 200 (FIGS. 4 and 5) with respect to the FIFOSEL signal, the BUSY signal, the IOCHRDY signal, and the DONE signal. These signals are synchronous with a clock CLK signal.

Figure 6:
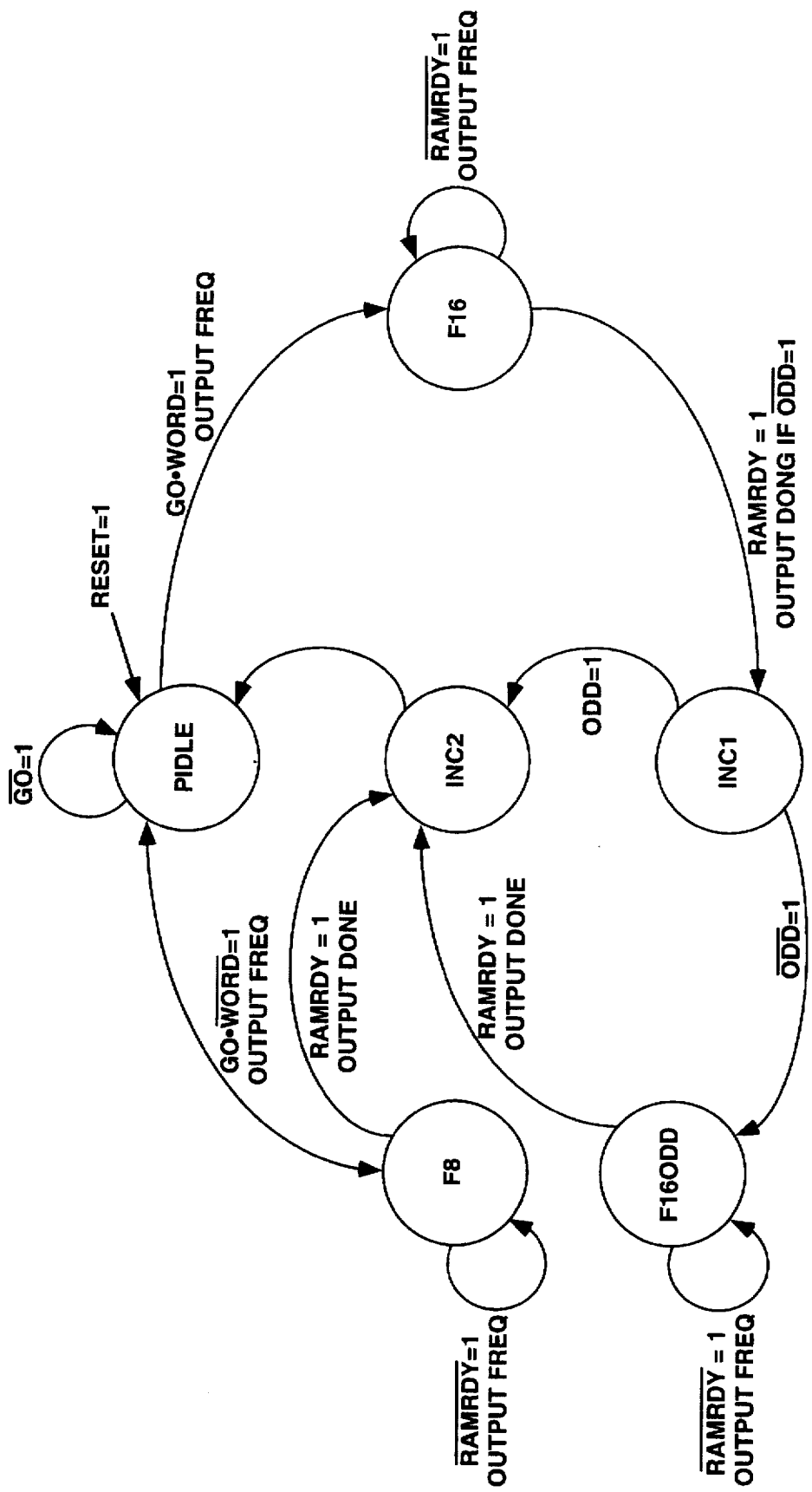
FIG. 6 is a state diagram of the FIFO transfer state circuitry of FIG. 4.

FIG. 6 illustrates the state transitions of FIFO transfer state circuitry 201 (FIG. 4). In FIG. 6, FIFO transfer state circuitry 201 is first reset to the "PIDLE" state. In this state, state circuit 201 waits for the GO signal to be activated by main FIFO state circuitry 200. When it sees the GO signal, state circuitry 201 activates a FREQ output signal to DRAM arbiter state circuitry 202 to begin requesting a FIFO transfer with DRAM 17. The FREQ signal indicates that FIFO interface 30 is currently requesting a FIFO transfer with DRAM 17.

If the GO signal is active, state circuitry 201 goes to an "F16" state if a WORD signal is active. The WORD signal indicates that the FIFO transfer needs to transfer a full word of data (i.e., 16 bits) The WORD signal is the BYTE/WORD signal in FIG. 3 from system bus interface and decoder 65. If the word signal is inactive (i.e., WORD=1), state circuitry 201 goes to an "F8" state to transfer a byte of data (i.e., 8 bits).

The "F8" state is used for single byte FIFO transfers. In the case of a read operation, a single byte of data must be read from DRAM 17 into read FIFO register 60 to replace the byte read by CPU 11 via system data bus 106. In the case of a write operation, a single byte of data written from CPU 11 to write FIFO register 61 must be written into DRAM 17.

In the "F8" state, state circuitry 201 continues to hold the FREQ signal active until RAMRDY state circuitry 206 returns an active RAMRDY signal (i.e., RAMRDY=1), indicating that the DRAM/FIFO transfer is complete. FIFO transfer state circuitry 201 then activates the DONE signal to inform main FIFO state circuitry 200 that the FIFO transfer is complete, and goes to an "INC2" state to increment the relevant pointer (i.e., read pointer 62 if it is a read operation and write pointer 63 if it is a write operation) by one.

The "F16" state is used to transfer a word of data. During a write transfer, if the address stored in write pointer 63 is even, then the entire word can be written in a single DRAM/FIFO transfer. If the address stored is odd, then the word must be written as two bytes, with write pointer 63 updated between bytes. The "F16" state will only allow the transfer of the first byte of the word when the address is odd. FIFO transfer state circuitry 201, in the "F16" state, continues to hold the FREQ signal active until the RAMRDY signal is active (i.e., RAMRDY=1). State circuitry 201 then moves to an "INC1" state to update the pointer. If the ODD signal is not activated which means the address is even, then the completed transfer is a word transfer and the DONE signal is activated to tell main FIFO state circuitry 200 that the transfer is complete.

In the "INC1" state, the pointer is incremented by one. State circuitry 201 then checks to determine if the address in the pointer is odd or even. If it is odd which means the address was even during the word transfer, state circuitry 201 can then proceed directly to "INC2" state to finish incrementing the relevant pointer.

If the address in the pointer is determined to be even which means that the address was odd during the transfer in the "F16" state, another transfer is requested to transfer the second byte of the word. FIFO transfer state circuitry 201 then goes to an "F16ODD" state to complete the transfer of the second byte. It is to be noted that the FREQ signal is not activated in the "INC1" state. This allows DRAM arbiter state circuitry 202 to recognize a new FREQ signal from the "F16ODD" state.

The "F16ODD" state handles the transfer of the second byte of the word. Like the "F8" and "F16" states, it activates the FREQ signal and waits for the RAMRDY signal to be activated when the transfer is complete. This state always activates the DONE signal to main FIFO state circuitry 200.

The relevant pointer is incremented in the "INC1" or "INC2" states because of the value of the $\overline{RD/WR}$ signal that was stored by the SAVECMD signal from main FIFO state circuitry 200. The WRITE INC signal of FIG. 3 is equal to RD/WR·CLK·(INC1+INC2). The READ INC signal of FIG. 3 is equal to $\overline{RD/WR}$·CLK·(INC1+INC2). The RD/WR signal is the inverted $\overline{RD/WR}$ signal.

Figure 7:
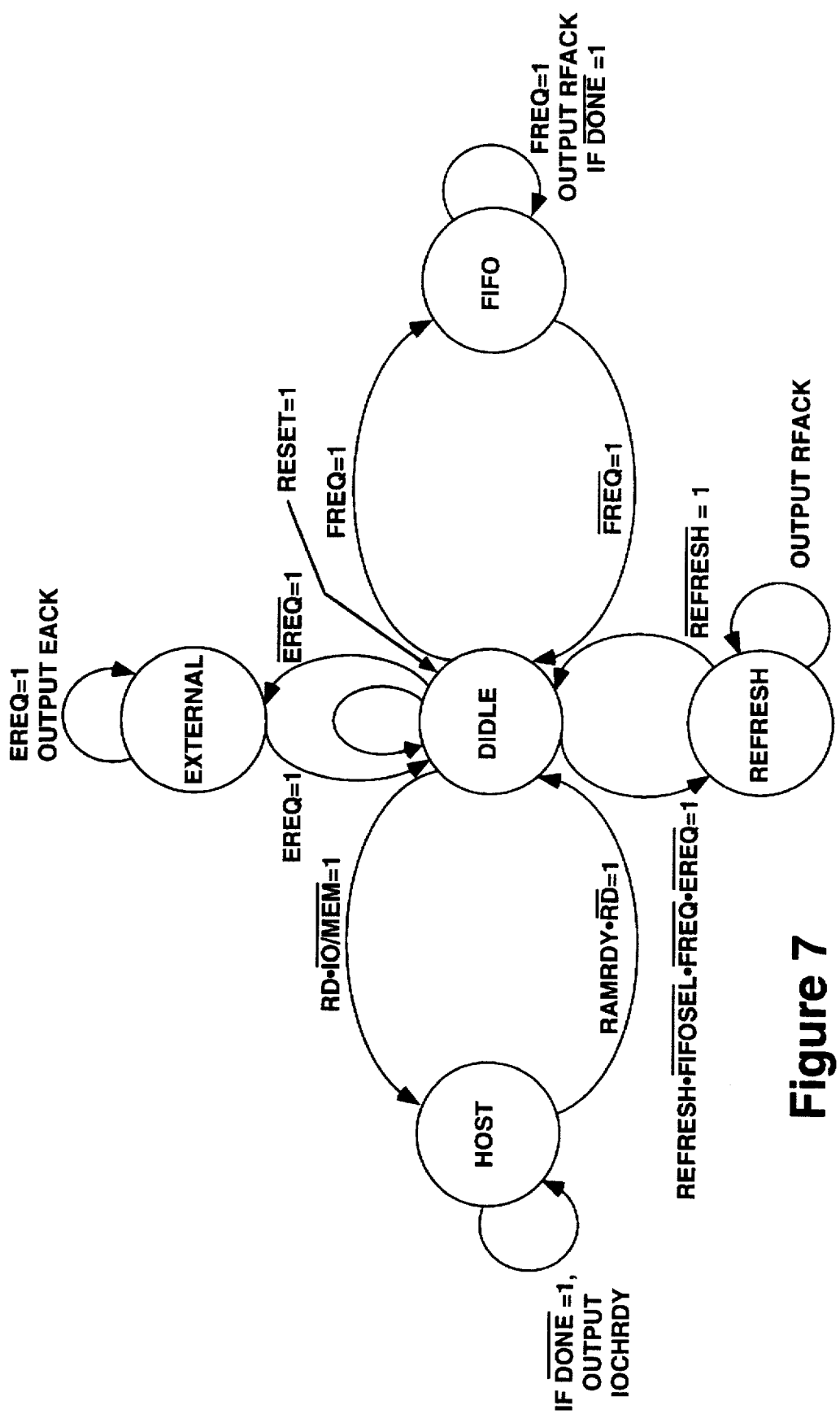
FIG. 7 is a state diagram of the DRAM arbiter state circuitry of FIG. 4.

Referring to FIG. 7, when DRAM arbiter state circuitry 202 is in a "DIDLE" state, DRAM 17 is idle and the arbiter is waiting for a request. When the IO/MEM signal from system bus interface and decoder circuitry 65 indicates that the FIFO interface 30 is in the memory mapped mode and the current operation is a read operation (i.e., RD=1), DRAM arbiter 202 goes to a "HOST" state. Note that arbiter 202 stays in this state until the RD signal goes inactive and the DRAM access is complete (RAMRDY=1). DRAM arbiter 202 then returns to the "DIDLE" state.

DRAM arbiter 202 goes to a "FIFO" state when FIFO transfer state circuitry 201 activates the FREQ signal. The "FIFO" state is used for any FIFO cycles. DRAM arbiter 202 returns to the "DIDLE" state when the FREQ signal is deactivated. DRAM arbiter 202 goes to a "REFRESH" state from the "DIDLE" state when the refresh circuit decides to refresh DRAM 17.

DRAM arbiter state circuitry 202 goes to an "EXTERNAL" state from the "DIDLE" state when external interface 31 requests a transfer with DRAM 17. This is triggered by the EREQ signal. DRAM arbiter 202 returns to the "DIDLE" state when the EREQ signal is deactivated. In the "EXTERNAL" state, DRAM arbiter 202 outputs an EACK signal to indicate that external interface 31 now owns DRAM 17.

Figure 8:
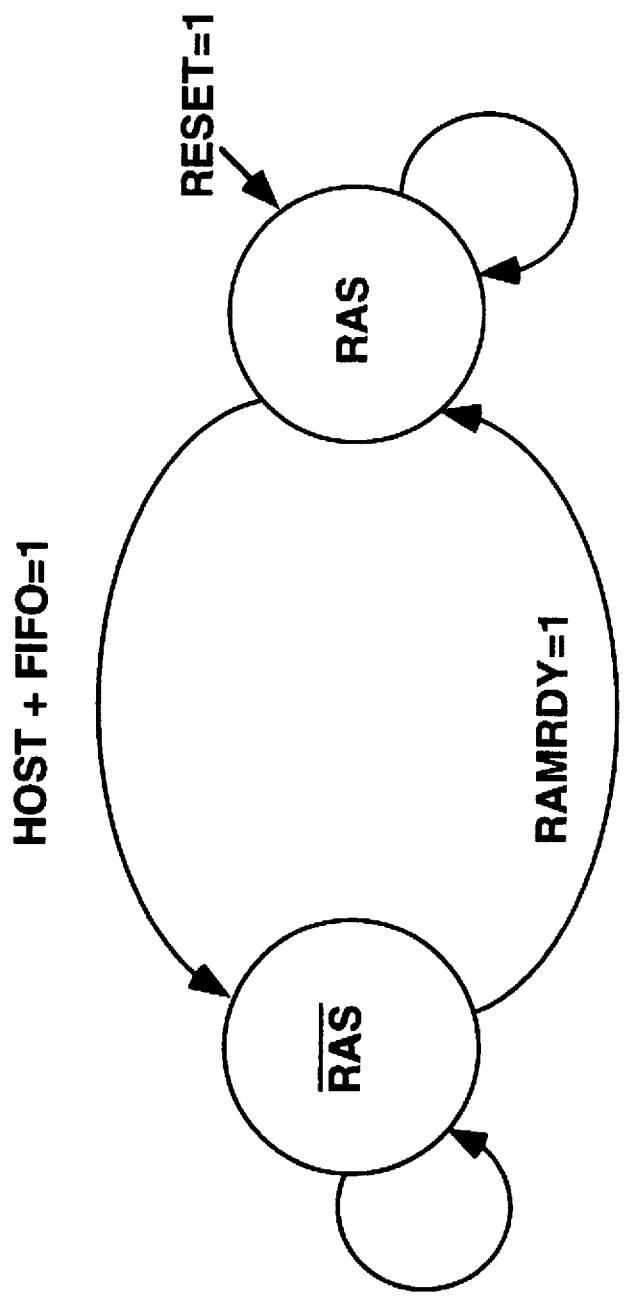
FIG. 8 is a state diagram of the RAS state circuitry of FIG. 4.

Referring to FIG. 8, RAS state circuitry 204 is reset at a "RAS" state.

When DRAM arbiter 202 enters the "HOST" or "FIFO" state, RAS state circuitry 204 is activated and the $\overline{RAS}$ signal will be applied to DRAM 17. RAS state circuitry 204 is deactivated by the RAMRDY signal (i.e., when RAMRDY state circuitry 206 is in the RAMRDY state).

Figure 9:
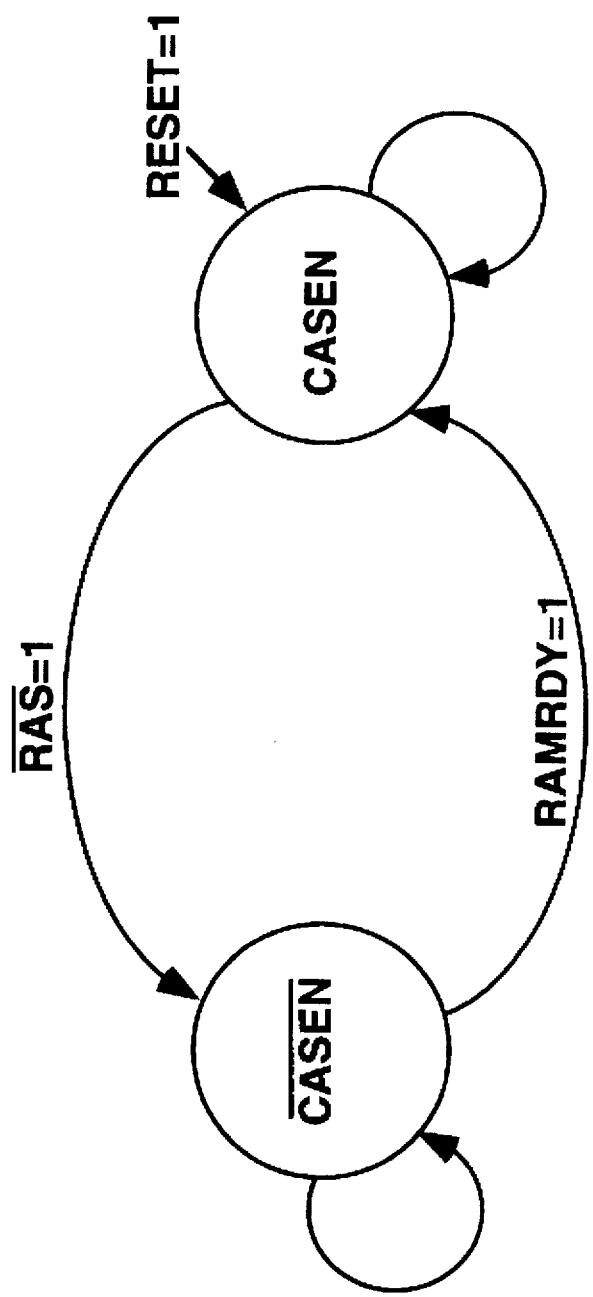
FIG. 9 is a state diagram of the CAS enable state circuitry of FIG. 4.
Figure 13:
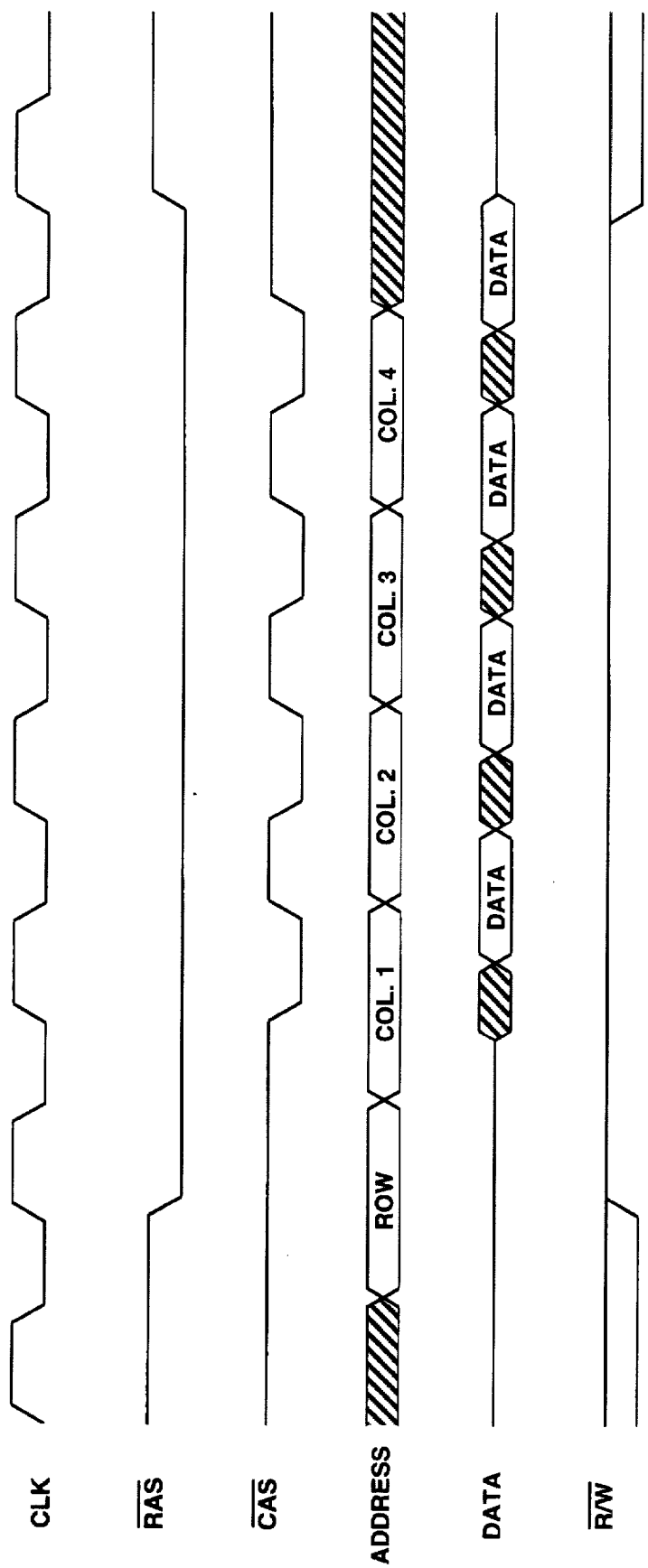
FIG. 13 is a timing diagram of the input and output signals of the FIFO interface FIG. 4 during a DRAM word read operation.
Figure 14:
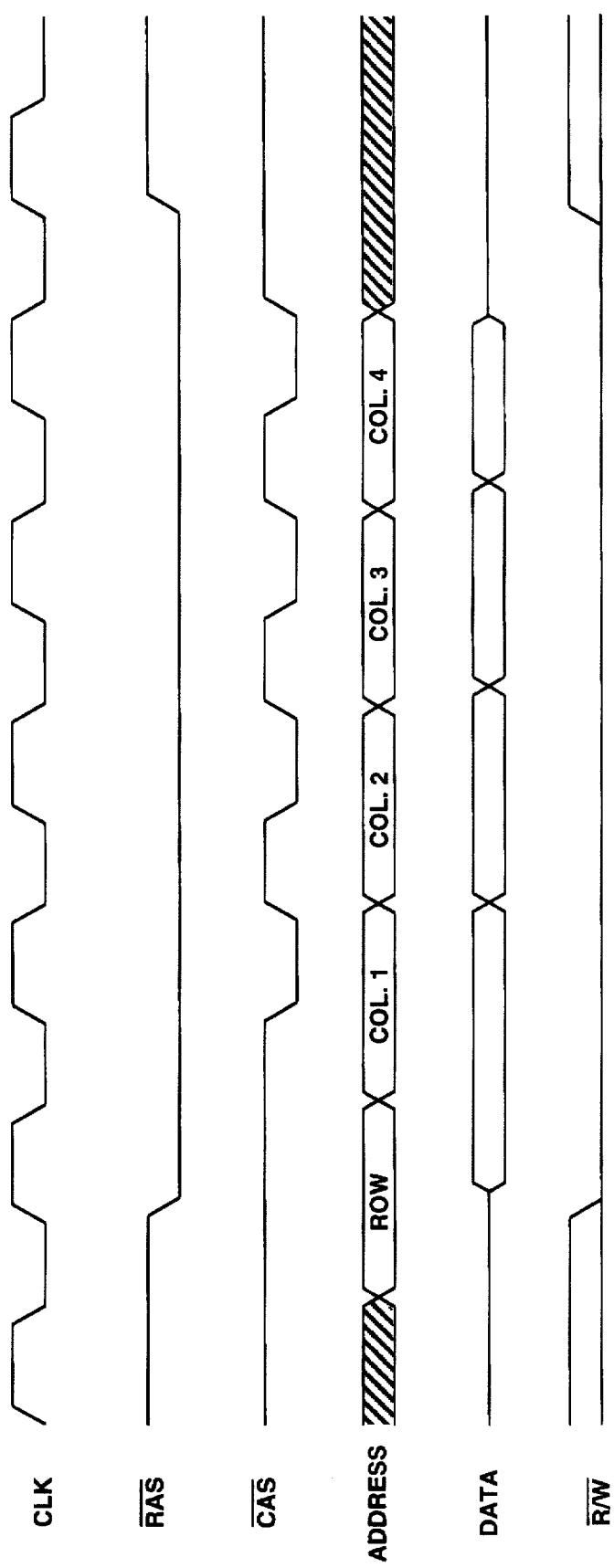
FIG. 14 is a timing diagram of the input and output signals of the FIFO interface of FIG. 4 during a DRAM word write operation.

FIG. 9 illustrates the states of CASEN state circuitry 205. Initially, the circuitry is reset to a "CASEN" state. One cycle after RAS state circuitry 205 is activated, CASEN state circuitry 205 is activated (i.e., $\overline{CASEN}$. This causes address bus 36 to switch to receive the column address. While CASEN state circuitry 205 is active, the $\overline{CAS}$ signal will have one cycle for each clock. FIGS. 13 and 14 illustrate the timing of the $\overline{RAS}$ and $\overline{CAS}$ signals during a word transfer with DRAM 17.

Figure 10:
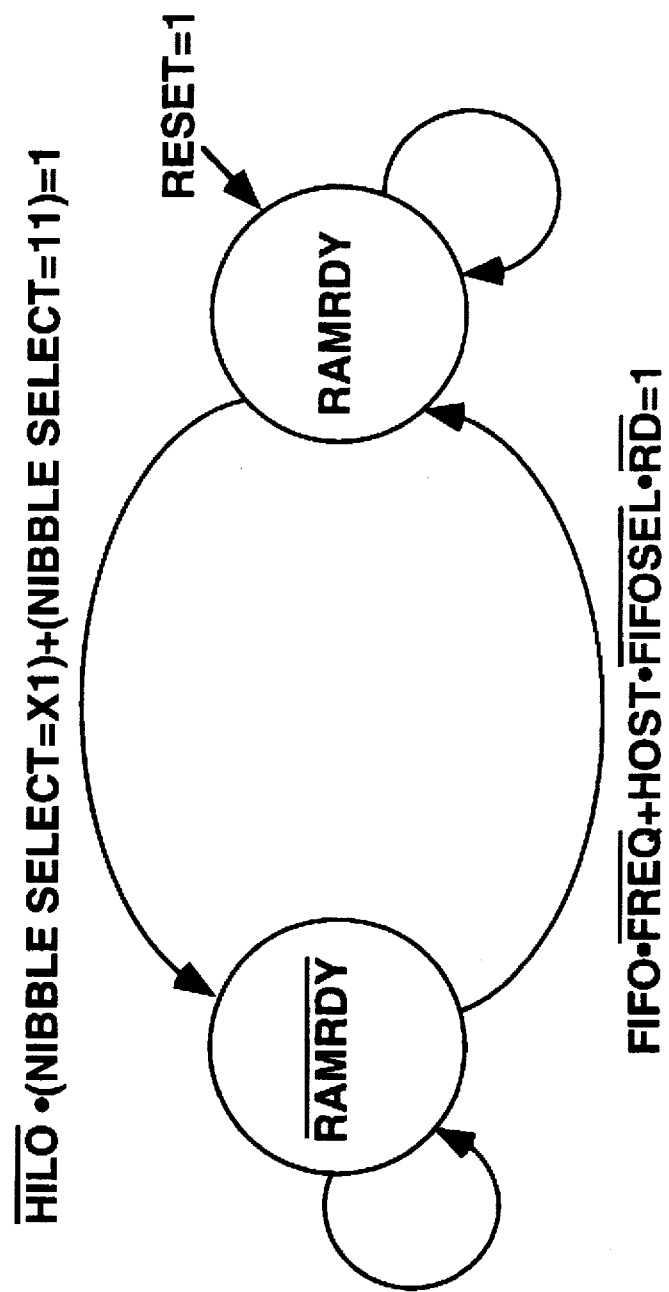
FIG. 10 is a state diagram of the DRAM ready state circuitry of FIG. 4.

Referring to FIG. 10, the state diagram of RAMRDY state circuitry 206 is shown. RAMRDY state circuitry 206 signals to other state circuitry that DRAM 17 has completed its transfer. RAMRDY state circuitry 206 cycles between "RAMRDY" and "$\overline{RAMRDY}$" states. RAMRDY state circuitry 206 watches nibble select state circuitry 203 to determine if DRAM 17 has completed its transfer.

Figure 11:
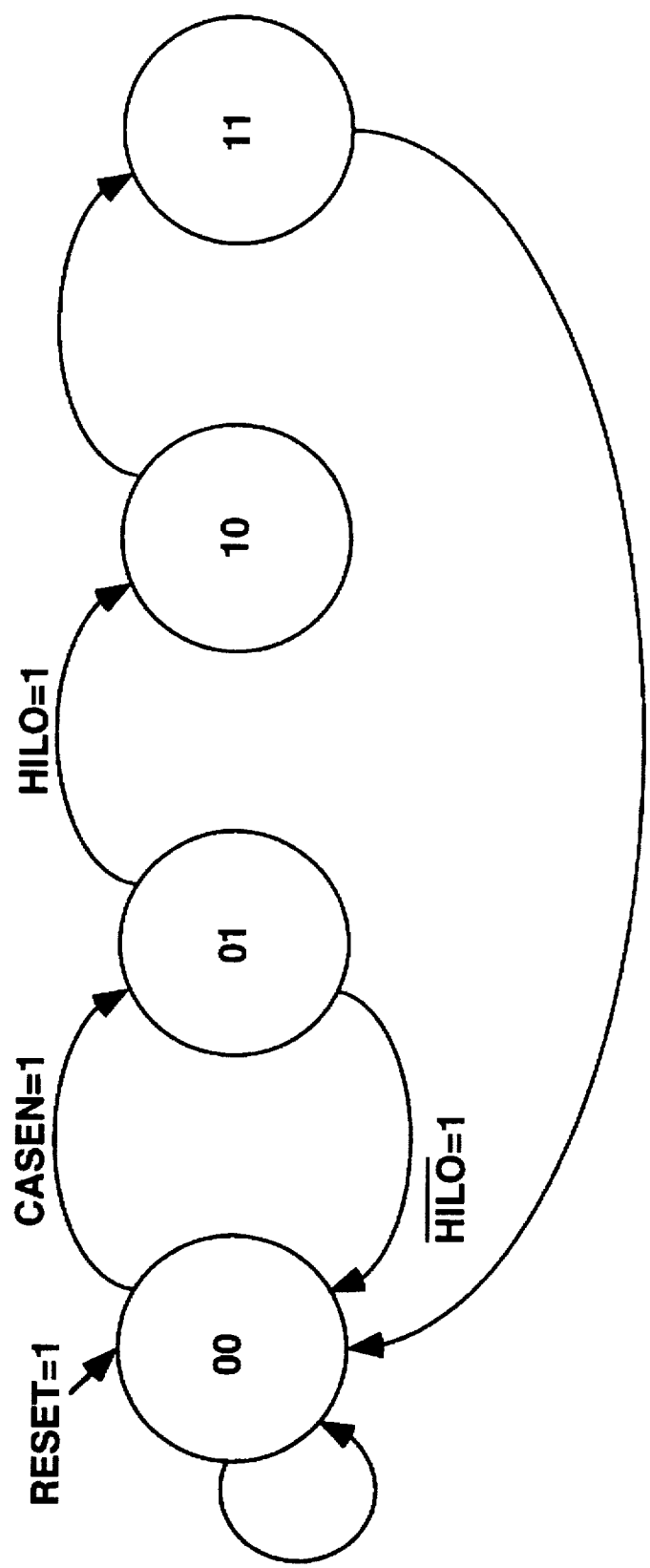
FIG. 11 is a state diagram of the nibble select state circuitry of FIG. 4.

Referring to FIG. 11, the state diagram of nibble select state circuitry 203 is shown. Nibble select state circuitry 203 outputs the NIBBLE SELECT signal. Nibble select state circuitry 203 cycles through only "00" and "01" states, unless a HILO signal is active (i.e., ODD=0 and WORD=1). The HILO signal indicates whether the transfer is a word transfer or a transfer with two bytes.

In the foregoing specification, the invention has been described with reference to specific embodiments therefore. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for interfacing a memory with a bus of a computer system having a data path width different from that of the memory, comprising:

(A) a first buffer for storing a first and a second portion of a first data sequentially read from the memory, wherein the first buffer is coupled (1) to the memory with an input data path width equal to the data path width of the memory and (2) to the bus with an output data path width equal to the data path width of the bus, wherein the input data path width of the first buffer is not equal to the output data path width of the first buffer;

(B) a second buffer for storing a first and a second portion of a second data read in parallel from the bus and to be sequentially written into the memory, wherein the second buffer is coupled (1) to the memory with an output data path width equal to the data path width of the memory and (2) to the bus with an input data path width equal to the data path width of the bus, wherein the input data path width of the second buffer is not equal to the output data path width of the second buffer; and (C) an address generation circuit coupled to the bus and the memory for generating (1) a first and a second memory address in accordance with a first address and (2) a third and a fourth memory address in accordance with a second address from the bus, wherein the first and second memory addresses cause the respective first and second portions of the first data to be sequentially read from the memory, wherein the third and fourth memory addresses cause the respective first and second portions of the second data to be sequentially written into the memory.

2. The apparatus of claim 1, wherein the address generation circuit further comprises a read address generation circuit for generating the first and second memory addresses and a write address generation circuit for generating the third and fourth memory addresses.

3. The apparatus of claim 2, wherein the read address generation circuit further comprises (1) a first plurality of multiplexers for generating the first and second memory addresses and (2) a first loadable counter coupled to the first plurality of multiplexers for receiving the first address from the bus, wherein the first plurality of multiplexers output the first and second memory addresses to the memory.

4. The apparatus of claim 2, wherein the write address generation circuit further comprises (1) a second plurality of multiplexers for generating the third and fourth memory addresses and (2) a second loadable counter coupled to the second plurality of multiplexers for receiving the second address from the bus, wherein the plurality of multiplexers output the third and fourth memory addresses to the memory.

5. The apparatus of claim 1, further comprising a control circuit coupled to the first and second buffers and the address generation circuit.

6. The apparatus of claim 5, wherein the first buffer further comprises a first and a second shift register coupled in series to the memory and in parallel to the bus for shifting the first and second portions of the first data among the first and second shift registers in a first-in-first-out order before sending the first data to the bus in parallel, wherein a total output data path width of the first and second shift registers forms the output data path width of the first buffer.

7. The apparatus of claim 6, wherein the control circuit generates a shift signal to the first and second shift registers such that the first and second portions of the first data can be stored in the first buffer in the first-in-first-out order during read operation.

8. The apparatus of claim 5, wherein the second buffer further comprises a multiplexer and a first and a second register coupled to the multiplexer, wherein each of the first and second registers has an output data path width equal to the data path width of the memory, wherein a total input data path width of the first and second registers forms the input data path width of the second buffer, wherein the control circuit causes the multiplexer to select one of the first and second portions of the second data stored in one of the first and second registers to the memory at a time during write operation.

9. The apparatus of claim 1, wherein the memory is a 4-bit dynamic random access memory, wherein the data path width of the bus is 16 bits wide, wherein the first buffer includes four shift registers, each being 4 bits wide, wherein the second buffer includes four registers arranged in parallel, each being 4 bits wide.

10. A method for interfacing a memory with a bus of a computer system having a data path width different from that of the memory, comprising the steps of:

(A) coupling an input of a first buffer to the memory and an output of the first buffer to the bus, wherein the first buffer has an input data path width equal to the data path width of the memory and an output data path width equal to the data path width of the bus, wherein the input data path width of the first buffer is not equal to the output data path width of the first buffer;

(B) coupling an input of a second buffer to the bus and an output of the second buffer to the memory, wherein the second buffer has an output data path width equal to the data path width of the memory and an input data path width equal to the data path width of the bus, wherein the input data path width of the second buffer is not equal to the output data path width of the second buffer; and (C) generating (1) a first and a second memory address in accordance with a first address and (2) a third and a fourth memory address in accordance with a second address from the bus, wherein the first and second memory addresses cause first and second portions of a first data to be sequentially read from the memory into the first buffer, wherein the third and fourth memory addresses cause first and second portions of a second data to be sequentially written into the memory from the second buffer.

11. The method of claim 10, further comprising the step of shifting the first and second portions of the first data in the first buffer in a first-in-first-out order before sending the first data to the bus in parallel during read operation of the memory.

12. The method of claim 10, further comprising the steps of (i) storing the first and second portions of the second data in the second buffer in parallel; and (ii) sequentially writing the first and second portions of the second data to the memory from the second buffer during write operation of the memory.

13. An apparatus for interfacing a first component with a second component having a data path width different from that of the first component, comprising:

(A) a first buffer coupled to the first and second components and having an input data path width equal to the data path width of the first component and an output data path width equal to the data path width of the second component, wherein the input data path width of the first buffer is not equal to the output data path width of the first buffer; and (B) an address generation circuit coupled to the first and second components, wherein the address generation circuit receives a first address from the second component and generates a first and a second component address to cause a first and a second portion of a first data to be read from the first component into the first buffer.

14. The apparatus of claim 13, further comprising a second buffer coupled to the first and second components and having an output data path width equal to the data path width of the first component and an input data path width equal to the data path width of the second component, wherein the input data path width of the second buffer is not equal to the output data path width of the second buffer.

15. The apparatus of claim 14, wherein the address generation circuit also receives a second address and generates a third and a fourth component address from the second address to cause first and second portions of a second data to be written into the first component from the second buffer.

16. The apparatus of claim 13, wherein the first component is a memory in a computer system.

17. The apparatus of claim 16, wherein the memory is a DRAM.

18. The apparatus of claim 13, wherein the second component is a bus in a computer system.

19. The apparatus of claim 13, wherein the first component is a memory in a computer system and the second component is a bus in the computer system.

20. An apparatus for interfacing a first component with a second component having a data path width different from that of the first component, comprising:

(A) a first buffer coupled to the first and second components and having an input data path width equal to the data path width of the first component and an output data path width equal to the data path width of the second component, wherein the input data path width of the first buffer is not equal to the output data path width of the first buffer; and (B) an address generation circuit coupled to the first and second components, wherein the address generation circuit receives a first address from the second component and generates a first and a second component address to cause a first and a second portion of a first data to be written into the first component from the first buffer.

21. The apparatus of claim 20, further comprising a second buffer coupled to the first and second components and having an output data path width equal to the data path width of the first component and an input data path width equal to the data path width of the second component, wherein the input data path width of the second buffer is not equal to the output data path width of the second buffer.

22. The apparatus of claim 21, wherein the address generation circuit also receives a second address and generates a third and a fourth component address from the second address to cause first and second portions of a second data to be read from the first component into the second buffer.

23. The apparatus of claim 20, wherein the first component is a memory in a computer system.

24. The apparatus of claim 23, wherein the memory is a DRAM.

25. The apparatus of claim 20, wherein the second component is a bus in a computer system.

26. The apparatus of claim 20, wherein the first component is a memory in a computer system and the second component is a bus in the computer system.

27. An apparatus for interfacing a first component with a second component having a data path width different from that of the first component, comprising:
(A) a first buffer coupled to the first and second components and having an input data path width equal to the data path width of the first component and an output data path width equal to the data path width of the second component, wherein the first buffer stores a first and a second portion of a first data, wherein the input data path width of the first buffer is not equal to the output data path width of the first buffer;
(B) a second buffer coupled to the first and second components and having an output data path width equal to the data path width of the first component and an input data path width equal to the data path width of the second component, wherein the second buffer stores a first and a second portion of a second data, wherein the input data path width of the second buffer is not equal to the output data path width of the second buffer; and
(C) an address generation circuit coupled to the first and second components, wherein the address generation circuit receives a first and a second address from the second component and generates (1) a first and a second component address from the first address to cause the respective first and second portions of the first data to be sequentially read from the first component and (2) a third and a fourth component address from the second address to cause the respective first and second portions of the second data to be sequentially written into the first component.

28. The apparatus of claim 27, wherein the address generation circuit further comprises a read address generation circuit for generating the first and second component addresses and a write address generation circuit for generating the third and fourth component addresses.

29. The apparatus of claim 28, wherein the read address generation circuit further comprises (1) a first plurality of multiplexers for generating the first and second component addresses and (2) a first loadable counter coupled to the first plurality of multiplexers for receiving the first address from the second component, wherein the first plurality of multiplexers output the first and second component addresses to the first component.

30. The apparatus of claim 28, wherein the write address generation circuit further comprises (1) a second plurality of multiplexers for generating the third and fourth component addresses and (2) a second loadable counter coupled to the second plurality of multiplexers for receiving the second address from the second component, wherein the plurality of multiplexers output the third and fourth component addresses to the first component.

31. The apparatus of claim 27, further comprising a control circuit coupled to the first and second buffers and the address generation circuit.

32. The apparatus of claim 27, wherein the first component is a memory in a computer system.

33. The apparatus of claim 32, wherein the memory is a DRAM.

34. The apparatus of claim 27, wherein the second component is a bus in a computer system.

35. The apparatus of claim 27, wherein the first component is a memory in a computer system and the second component is a bus in the computer system.

36. The apparatus of claim 35, wherein the memory is a DRAM.

37. The apparatus of claim 27, wherein each of the first and second data further includes a third portion and a fourth portion in addition to the first and second portions, wherein the first buffer stores the first, second, third, and fourth portions of the first data and the second buffer stores the first, second, third, and fourth portions of the second data, wherein the address generation circuit generates (1) a fifth and a sixth component address in addition to the first and second component addresses from the first address to cause the respective first, second, third, and fourth portions of the first data to be sequentially read from the first component, and (2) a seventh and an eighth component address in addition to the third and fourth component addresses from the second address to cause the respective first, second, third, and fourth portions of the second data to be sequentially written into the first component.

38. A computer system, comprising:
(A) a microprocessor;
(B) a bus;
(C) an integrated circuit having a data path width different from that of the bus;
(D) an interface adapter circuit coupled between the integrated circuit and the bus, comprising
(I) a first buffer coupled to the integrated circuit and the bus and having an input data path width equal to the data path width of the integrated circuit and an output data path width equal to the data path width of the bus, wherein the first buffer stores a first and a second portion of a first data, wherein the input data path width of the first buffer is not equal to the output data path width of the first buffer;
(II) a second buffer coupled to the integrated circuit and the bus and having an output data path width equal to the data path width of the integrated circuit and an input data path width equal to the data path width of the bus, wherein the second buffer stores a first and a second portion of a second data, wherein the input data path width of the second buffer is not equal to the output data path width of the second buffer; and
(III) an address generation circuit coupled to the bus and the integrated circuit to receive a first and a second address, wherein the address generation circuit generates (1) a first and a second integrated circuit address from the first address to cause the respective first and second portions of the first data to be sequentially read from the integrated circuit and (2) a third and a fourth integrated circuit address from the second address to cause the respective first and second portions of the second data to be sequentially written into the integrated circuit.

39. The computer system of claim 38, wherein the address generation circuit further comprises a read address generation circuit for generating the first and second integrated circuit addresses and a write address generation circuit for generating the third and fourth integrated circuit addresses.

40. The computer system of claim 39, wherein the read address generation circuit further comprises (1) a first plurality of multiplexers for generating the first and second integrated circuit addresses and (2) a first loadable counter coupled to the first plurality of multiplexers for receiving the first address from the bus, wherein the first plurality of multiplexers output the first and second integrated circuit addresses to the integrated circuit.

41. The computer system of claim 39, wherein the write address generation circuit further comprises (1) a second plurality of multiplexers for generating the third and fourth integrated circuit addresses and (2) a second loadable counter coupled to the second plurality of multiplexers for receiving the second address from the bus, wherein the plurality of multiplexers output the third and fourth integrated circuit addresses to the integrated circuit.

42. The computer system of claim 38, wherein the interface adapter circuit further comprises a control circuit coupled to the first and second buffers and the address generation circuit.

43. The computer system of claim 38, wherein the integrated circuit is a memory.

44. The computer system of claim 43, wherein the memory is a DRAM.

45. The computer system of claim 38, wherein each of the first and second data further includes a third portion and a fourth portion in addition to the first and second portions, wherein the first buffer stores the first, second, third, and fourth portions of the first data and the second buffer stores the first, second, third, and fourth portions of the second data, wherein the address generation circuit generates (1) a fifth and a sixth integrated circuit address in addition to the first and second integrated circuit addresses from the first address to cause the respective first, second, third, and fourth portions of the first data to be sequentially read from the integrated circuit, and (2) a seventh and an eighth integrated circuit address in addition to the third and fourth integrated circuit addresses from the second address to cause the respective first, second, third, and fourth portions of the second data to be sequentially written into the integrated circuit.

\* \* \* \* \*